US007480462B2

(12) United States Patent
Ternullo et al.

(10) Patent No.: US 7,480,462 B2
(45) Date of Patent: Jan. 20, 2009

(54) METHOD AND APPARATUS FOR INFRARED DATA COMMUNICATION

(75) Inventors: Noah J. Ternullo, Owego, NY (US); Nader Mehravari, Owego, NY (US); Patrick H. Madden, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 11/745,117

(22) Filed: May 7, 2007

(65) Prior Publication Data
US 2007/0223930 A1    Sep. 27, 2007

Related U.S. Application Data

(62) Division of application No. 09/930,421, filed on Aug. 15, 2001, now Pat. No. 7,215,887.

(60) Provisional application No. 60/225,349, filed on Aug. 15, 2000.

(51) Int. Cl.
*H04B 10/00* (2006.01)
(52) U.S. Cl. .................. 398/135; 138/128; 138/138
(58) Field of Classification Search .............. 398/128, 398/135, 136, 138, 127
See application file for complete search history.

(56) References Cited

U.S. PATENT DOCUMENTS

| | | | |
|---|---|---|---|
| 4,975,926 A | 12/1990 | Knapp | |
| 4,992,940 A | 2/1991 | Dworkin | |
| 5,047,614 A | 9/1991 | Bianco | |
| 5,067,104 A | 11/1991 | Krishnakumar et al. | |
| 5,250,789 A | 10/1993 | Johnsen | |
| 5,260,936 A | 11/1993 | Bardet et al. | |
| 5,260,938 A | 11/1993 | Hofmann | |
| 5,295,064 A | 3/1994 | Malec et al. | |
| 5,307,349 A | 4/1994 | Shloss et al. | |
| 5,321,542 A | 6/1994 | Freitas et al. | |

(Continued)

FOREIGN PATENT DOCUMENTS

DE    19718904 A1    12/1998

(Continued)

OTHER PUBLICATIONS

Noah J. Ternullo et al., U.S. Appl. No. 09/930,004, filed Aug. 15, 2001, "Method and Apparatus for Reliable Unidirectional Communication in a Data Network".
Noah J. Ternullo et al., U.S. Appl. No. 09/929,979, filed Aug. 15, 2001, "Method and Apparatus for Determining the Context of a Handheld Device".

(Continued)

*Primary Examiner*—Dalzid Singh
(74) *Attorney, Agent, or Firm*—Burns & Levinson LLP; Jacobson N. Erlich; Kathleen Chapman

(57) ABSTRACT

An apparatus and method for conveying contextually relevant information to a wireless client (112) is disclosed. More particularly, an emitter (108) transmits a diffuse infrared signal to a client (112) having an IrDA infrared communication interface (130). Emitter (108) communicates with client (112) by making a link layer in emitter (108) compliant with an IrDA link layer running on client (112). To perform communication, data is received at emitter (108) from a service provider (102). The data is formatted into an IrDA compliant diffuse infrared signal and transmitted to client (112). Client (112) receives the data and parses it to extract contextually relevant information contained therein.

20 Claims, 21 Drawing Sheets

U.S. PATENT DOCUMENTS

| | | | |
|---|---|---|---|
| 5,410,326 A | 4/1995 | Goldstein | |
| 5,420,572 A | 5/1995 | Dolin, Jr. et al. | |
| 5,424,524 A | 6/1995 | Ruppert et al. | |
| 5,469,206 A | 11/1995 | Strubbe et al. | |
| 5,546,211 A | 8/1996 | Devon | |
| 5,611,051 A | 3/1997 | Pirelli | |
| 5,617,236 A * | 4/1997 | Wang et al. | 398/117 |
| 5,646,608 A | 7/1997 | Shintani | |
| 5,663,952 A | 9/1997 | Gentry, Jr. | |
| 5,664,110 A | 9/1997 | Green et al. | |
| 5,758,087 A | 5/1998 | Aaker et al. | |
| 5,790,295 A | 8/1998 | Devon | |
| 5,790,605 A | 8/1998 | Helm et al. | |
| 5,802,460 A * | 9/1998 | Parvulescu et al. | 455/92 |
| 5,815,516 A | 9/1998 | Aaker et al. | |
| 5,825,002 A | 10/1998 | Roslak | |
| 5,831,664 A | 11/1998 | Wharton et al. | |
| 5,832,296 A | 11/1998 | Wang et al. | |
| 5,844,544 A | 12/1998 | Kahn et al. | |
| 5,845,263 A | 12/1998 | Camaisa et al. | |
| 5,845,282 A | 12/1998 | Alley et al. | |
| 5,850,433 A | 12/1998 | Rondeau | |
| 5,852,664 A | 12/1998 | Iverson et al. | |
| 5,857,201 A | 1/1999 | Wright, Jr. et al. | |
| 5,867,292 A | 2/1999 | Crimmins et al. | |
| 5,873,045 A | 2/1999 | Lee et al. | |
| 5,878,218 A | 3/1999 | Maddalozzo, Jr. et al. | |
| 5,884,215 A | 3/1999 | Birchler et al. | |
| 5,897,622 A | 4/1999 | Blinn et al. | |
| 5,898,713 A | 4/1999 | Melzer et al. | |
| 5,898,836 A | 4/1999 | Freivald et al. | |
| 5,912,752 A | 6/1999 | Mollett | |
| 5,923,735 A | 7/1999 | Swartz et al. | |
| 5,946,697 A | 8/1999 | Shen | |
| 5,950,173 A | 9/1999 | Perkowski | |
| 5,956,693 A | 9/1999 | Geerlings | |
| 5,966,225 A | 10/1999 | Taglione et al. | |
| 5,969,678 A | 10/1999 | Stewart | |
| 5,971,277 A | 10/1999 | Cragun et al. | |
| 5,979,757 A | 11/1999 | Tracy et al. | |
| 5,982,520 A | 11/1999 | Weiser et al. | |
| 5,986,787 A | 11/1999 | Ohshima et al. | |
| 6,009,441 A | 12/1999 | Mathieu et al. | |
| 6,012,049 A | 1/2000 | Kawan | |
| 6,026,088 A | 2/2000 | Rostoker et al. | |
| 6,038,551 A | 3/2000 | Barlow et al. | |
| 6,044,403 A | 3/2000 | Gerszberg et al. | |
| 6,061,057 A | 5/2000 | Knowlton et al. | |
| 6,064,502 A | 5/2000 | Burns et al. | |
| 6,064,979 A | 5/2000 | Perkowski | |
| 6,065,681 A | 5/2000 | Trueggelmann | |
| 6,073,112 A | 6/2000 | Geerlings | |
| 6,073,842 A | 6/2000 | Yoshinaga | |
| 6,078,806 A | 6/2000 | Heinonen et al. | |
| 6,085,030 A | 7/2000 | Whitehead et al. | |
| 6,092,053 A | 7/2000 | Boesch et al. | |
| 6,092,120 A | 7/2000 | Swaminathan et al. | |
| 6,094,724 A | 7/2000 | Benhammou et al. | |
| 6,098,188 A | 8/2000 | Kalmanek, Jr. | |
| 6,101,483 A | 8/2000 | Petrovich et al. | |
| 6,101,486 A | 8/2000 | Roberts et al. | |
| 6,108,703 A | 8/2000 | Leighton et al. | |
| 6,119,935 A | 9/2000 | Jelen et al. | |
| 6,123,259 A | 9/2000 | Ogasawara | |
| 6,125,352 A | 9/2000 | Franklin et al. | |
| 6,129,276 A | 10/2000 | Jelen et al. | |
| 6,185,541 B1 | 2/2001 | Scroggie et al. | |
| 6,189,781 B1 | 2/2001 | Yoshinaga et al. | |
| 6,199,753 B1 | 3/2001 | Tracy et al. | |
| 6,249,767 B1 | 6/2001 | Okayama et al. | |
| 6,272,575 B1 | 8/2001 | Rajchel | |
| 6,278,499 B1 | 8/2001 | Darbee et al. | |
| 6,292,283 B1 | 9/2001 | Grandbois | |
| 6,311,167 B1 | 10/2001 | Davis et al. | |
| 6,381,465 B1 | 4/2002 | Chern et al. | |
| 6,385,591 B1 | 5/2002 | Mankoff | |
| 6,397,057 B1 | 5/2002 | Malackowski et al. | |
| 6,405,318 B1 | 6/2002 | Rowland | |
| 6,505,046 B1 | 1/2003 | Baker | |
| 6,568,596 B1 | 5/2003 | Shaw | |
| 6,587,835 B1 | 7/2003 | Treyz et al. | |
| 6,601,038 B1 | 7/2003 | Kolls | |
| 6,629,151 B1 | 9/2003 | Bahl | |
| 6,650,451 B1 | 9/2003 | Byers et al. | |
| 6,643,284 B1 * | 11/2003 | Inoue et al. | 370/352 |
| 6,643,510 B2 | 11/2003 | Taylor | |
| 6,643,650 B1 | 11/2003 | Slaughter et al. | |
| 6,647,269 B2 | 11/2003 | Hendrey et al. | |
| 6,684,399 B1 | 1/2004 | Grooters | |
| 6,690,887 B1 * | 2/2004 | Sano | 398/127 |
| 6,721,787 B1 | 4/2004 | Hiscock | |
| 6,728,774 B1 * | 4/2004 | Nykanen | 709/230 |
| 6,738,951 B1 | 5/2004 | Weiss et al. | |
| 6,760,916 B2 | 7/2004 | Holtz et al. | |
| 6,766,163 B1 | 7/2004 | Sharma et al. | |
| 6,785,902 B1 | 8/2004 | Zigmond et al. | |
| 6,795,429 B1 * | 9/2004 | Schuster et al. | 370/352 |
| 6,857,013 B2 | 2/2005 | Ramberg et al. | |
| 6,857,021 B1 | 2/2005 | Schuster et al. | |
| 6,966,027 B1 | 11/2005 | Krasinski | |
| 6,975,835 B1 | 12/2005 | Lake et al. | |
| 7,072,939 B1 * | 7/2006 | Amro et al. | 709/204 |
| 7,200,848 B1 | 4/2007 | Slaughter et al. | |
| 2001/0049636 A1 | 12/2001 | Hudda et al. | |
| 2001/0054114 A1 | 12/2001 | DuVal et al. | |
| 2002/0006788 A1 | 1/2002 | Knutsson et al. | |
| 2002/0019782 A1 | 2/2002 | Hershtik | |
| 2002/0052781 A1 | 5/2002 | Aufricht et al. | |
| 2002/0055924 A1 | 5/2002 | Liming | |
| 2002/0083179 A1 | 6/2002 | Shaw et al. | |
| 2002/0104087 A1 | 8/2002 | Schaffer et al. | |
| 2003/0130909 A1 | 7/2003 | Caci et al. | |
| 2005/0097008 A1 | 5/2005 | Ehring et al. | |

FOREIGN PATENT DOCUMENTS

| | | |
|---|---|---|
| EP | 0552861 A2 | 7/1993 |
| EP | 0837406 A2 | 4/1998 |
| WO | WO 98/18094 A1 | 4/1998 |
| WO | WO 01/20526 A1 | 3/2001 |
| WO | PCT/US01/25593 | 8/2001 |
| WO | WO 02/15438 A1 | 2/2002 |

OTHER PUBLICATIONS

Noah J. Ternullo et al., U.S. Appl. No. 09/929,995, filed Aug. 15, 2001, "Method and Apparatus for Delivering Services in a Constrained Environment".

Noah J. Ternullo et al., U.S. Appl. No. 60/225,349, filed Aug. 15, 2001, "A Communication Infrastructure for Pushing Context to a Mobile PDA".

John Cox, "WideRay Beams Data to Handhelds", Network World, May 27, 2002; pp. 15 and 18.

Postel, J. (Ed.), Sep. 1981, "Transmission Control Protocol: Darpa Internet Program Protocol Specification", Defense Advanced Research Projects Agency, etc., UCLA.

Braden, R. et al., Sep. 1988, "Computing the Internet Checksum", Braden, Borman & Partridge memo, pp. 1-24.

Bohm, K., "On Extending the XML Engine with Query-Processing Capabilities", 2000, IEEE, 0-7685-0659-3/00.

Dan Jones, Bluestone Pushes XML as PDA Data Synchronization Method by Computergram International, Apr. 28, 1999.

* cited by examiner

BANNER ELEMENT
302

SERVICE ELEMENT
304

CONTEXT ELEMENT
306

FIG. 3

BROADCAST INFORMATION
UPDATE DATA
602

CLIENT REQUEST DATA

604

SERVICE RESPONSE DATA

606

CLIENT SERVICE PROPRIETARY
COMMUNICATION DATA
608

SERVICE TO SERVICE
COMMUNICATION DATA
610

OTHER MISCELLANEOUS TRAFFIC

METHOD AND APPARATUS FOR INFRARED DATA COMMUNICATION

CROSS REFERENCE TO RELATED APPLICATIONS

The instant application is a divisional application of U.S. patent application Ser. No. 09/930,421, filed Aug. 15, 2001 and entitled METHOD AND APPARATUS FOR INFRARED DATA COMMUNICATION. The instant application claims priority from provisional application Ser. No. 60/225,349 filed Aug. 15, 2000 and entitled "InfoFlo: A Common Infrastructure for Pushing Context to a Mobile PDA," which is hereby incorporated by reference herein in its entirety. The instant application is also related to the following United States Patent Applications having:

(1) Ser. No. 09/930,004, entitled "METHOD AND APPARATUS FOR RELIABLE UNIDIRECTIONAL COMMUNICATION IN A DATA NETWORK,"

(2) Ser. No. 09/929,979, entitled "METHOD AND APPARATUS FOR DETERMINING THE CONTEXT OF A HANDHELD DEVICE,"

(3) Ser. No. 09/929,995, filed on Aug. 15, 2001, entitled "METHOD AND APPARATUS FOR DELIVERING SERVICES IN A CONSTRAINED ENVIRONMENT,"

all having assignee in common with the instant application, all filed on even date herewith, and all of which are hereby incorporated by reference in their entirety.

BACKGROUND OF THE INVENTION

1. Field of the Invention

The present invention relates generally to the field of wireless data communications and more particularly to eXtensible Markup Language (XML) based wireless data communications for facilitating context sensitive computing.

2. Description of Prior Art

Proliferation of the Internet has made it possible for users to access vast amounts of data almost effortlessly. For example, with only a few mouse clicks users may inundate themselves with data such as; commercial data, scientific data, educational data, financial data, and data on general areas of interest such as sports and hobbies. Ease of access to networked data has helped fuel demand for even more types of data. Accompanying users' demand for data is a desire to have data sorted based on user preferences before the data is viewed or utilized. Failure to deliver data to users in a sorted manner wastes the users' time, leads to network congestion because of repeated requests for new data, and wastes processing and storage resources if large amounts of data must be processed to present a user with relevant information.

Problems associated with unfiltered data are especially challenging when users wish to take advantage of information while remaining mobile. These users are increasingly relying on wireless devices such as personal digital assistants (PDAs), handheld computers and web enabled cell phones for processing information when on the go. One example would be a wireless device used to store personal contact information, calendars, email, business information, and financial information. While wireless devices have some processing capabilities, they are very limited when compared to desktop computing devices. Since wireless devices normally run on batteries, efforts must be made to reduce power consumption. Typically, slow speed processors and reduced memory sizes are employed to reduce power consumption. In addition, reducing the use of, or eliminating, power hungry add-on components such as radio frequency transceivers (e.g. cellular and wireless Ethernet), modems, global positioning system (GPS) receivers, and the like help to extend the life of batteries in wireless devices.

Context sensitive computing may be employed to address some of the shortcomings associated with providing unfiltered data to wireless devices. More specifically, context sensitive computing attempts to send users only data that is relevant to their needs. Context as used herein is comprised of two parts. The first part is environmental context and it describes the physical location of a user, e.g. an airport, a car, or a store. The second part is referred to personal context and it is associated with a user's personal preferences, e.g. a particular colored shirt, a favorite author, etc. In principle, context sensitive computing makes it possible to provide users of wireless devices having limited processing capabilities with relevant information.

To aid in the understanding of how contextual computing can aid users of wireless devices by providing them with relevant information, an example will be presented. In this example a consumer wants to make a purchase at a shopping mall. In addition, the consumer wants to have relevant information, such as the latest sale price and industry reviews for a desired product, and the consumer wants to know which merchant carries a particular style or colored item. The consumer has two primary options for using data to facilitate selection of a product and a possible purchase. For example, the consumer may first review data in their home or at a library and make notes or print copies of the materials to then take shopping with them. The disadvantage with this approach is that the consumer may be using stale data when attempting to make the purchase at the merchant's location. Alternatively, a consumer trying to avoid using stale data in facilitating a purchase may attempt to ask various merchants for the latest pricing and selection options of the desired product. This later approach has a disadvantage in that it does not use the consumer's time efficiently.

In the example above, the consumer would be better served if they employed wireless computing devices to ensure that the latest data is presented to them in the most efficient manner. In order to present a consumer with relevant information, the wireless device should be able to determine the environmental context that the consumer operating in the example. Where environmental context refers to the physical environment in which the consumer is operating, here a mall or a particular store within a mall. In addition, the wireless device should be able to sort available information so that a consumer is only presented with information that is relevant only to their interests.

Prior art techniques for determining environmental context rely on the wireless device for processing information to determine position; or they use the infrastructure (i.e. ground based transmitters) to process information received from a wireless device to establish its location. When the wireless device processes data to establish position, global positioning receivers (OPS) receivers are normally used. Some of the disadvantages associated with GPS receivers are that they require additional power and do not work well indoors. When the network infrastructure attempts to determine position, radio-frequency (RF) ranging techniques are used. RF ranging techniques normally employ beacons that transmit data to and receive data from wireless device. Some of the disadvantages associated with RF beaconing techniques are that their locational accuracy is not very good and the wireless device consumes excessive power when transmitting beacon signals or when processing received beacon signals.

Prior art techniques for communicating data to wireless devices also have shortcomings. RF signals are the primary means for transmitting data to wireless devices. Cellular, wireless Ethernet, BLUETOOTH™ (short-range communications of data and voice), and microwave are some of the most common prior art methods for communicating data to wireless devices. These forms of communication also consume large amounts of power.

It is thus a general object of the present invention to eliminate problems associated with communicating information to IrDA communication interfaces using diffuse infrared signals.

It is another object of the present invention to allow IrDA equipped devices to receive data over an IrDA communication interface at ranges greater than two meters.

It is a further object of the present invention to allow IrDA-to-IrDA communications when a diffuse infrared signal is not present at an IrDA communication interface.

It is still a further object of the present invention to take advantage of existing transmission infrastructure thus facilitating cost effective deployment of disclosed embodiments.

SUMMARY OF THE INVENTION

Embodiments of the present invention employ apparatus, computer program product, method, and/or computer-readable-signal for performing infrared data communications to a handheld device. More specifically, a transmitter for use in a network carrying a plurality of data bits is provided. The transmitter includes a physical layer and a first link layer. A means for providing at least a subset of the plurality of data bits and a means for making the first link layer in the transmitter match a second link layer in the handheld device are employed. Then a means for making at least a subset of the plurality of data bits available to the first link layer and a means for making them available to the first physical layer are used. A means for generating a signal comprising the subset of the plurality of data bits is also provided. A means for transmitting sends the signal to the first handheld device in a format compliant with and receivable by the second link layer. In an alternative embodiment, the transmitter conveys a diffuse infrared signal having a wavelength in the range of substantially 850 nanometers to 1250 nanometers.

In a further aspect of the invention, a handheld device receives a unidirectional infrared signal containing a message over a communication medium. The handheld device comprises a physical layer, a link layer and a means for receiving the transmitted signal to produce a received signal. The received signal is then passed to the physical layer by a passing means before being passed to the link layer. Then information contained in the received signal is used to accomplish a task by a utilizing means. In an alternative embodiment, the handheld device receives a diffuse infrared signal at a bi-directional communication interface; and in yet another embodiment, the received signal contains a broadcast XML element encapsulated in an integrity XML element.

In yet a further aspect of the invention, a method of utilizing executable code in a handheld device is disclosed. The executable code causes the handheld device to receive a signal at a physical layer communicatively associated with a communication interface forming a received signal. Next the received signal is passed from the physical layer to a link layer and then information contained in the received signal is extracted. Then the executable code causes the information to be made available to a user of the handheld device. In an alternative embodiment of the invention, a plug-in is used to extract information contained in the received signal and for making the information available to a user of the handheld device.

In still a further aspect of the invention, a method for conveying at least a subset of a plurality of data bits from a transmitter to a handheld device is disclosed. A first link layer in the transmitter is made to match a second link layer in the handheld device. Then at least a subset of the plurality of bits is provided. The subset of data bits is made available to the first link layer and then they are received at a first physical layer. An infrared signal comprising the subset of data bits is generated and conveyed to a communication interface associated with the handheld device. The subset of data bits is further provided in a format compliant with and receivable by the second link layer. In an alternative embodiment, the first and second link layers are both infrared-data-association (IrDA) compliant.

In still a further aspect of the invention, a method of receiving a unidirectional infrared data signal from a transmitter is disclosed. The data signal is received at a communication interface to form a received signal. The received signal is passed from the communication interface to a physical layer and then made available to a link layer. Then information contained in the received signal is utilized by the handheld device to accomplish a task. In an alternative embodiment, the communication interface is an infrared-data-association (IrDA) compliant bi-directional communication interface.

It is advantageous to employ embodiments of the present invention to eliminate problems associated with conveying information to IrDA equipped devices using diffuse infrared signals. A further advantage of the invention is that it allows an IrDA equipped device to receive data at longer ranges without requiring special communication interfaces. Furthermore, the present invention makes it possible to transmit contextually relevant information to an IrDA equipped device using diffuse infrared signals. Still a further advantage of the invention is that it allows IrDA-to-IrDA communications to occur when a diffuse signal is not present at an infrared communication interface on an IrDA equipped device. Yet another advantage of the invention is that it takes advantage of existing transmission infrastructure thus facilitating cost effective deployment of disclosed embodiments.

Further objects and advantages of the present invention will become more apparent after reference to the detailed description of exemplary embodiments thereof taken in conjunction with the accompanying drawings in which:

BRIEF DESCRIPTION OF THE DRAWINGS

FIG. 3 is a block diagram showing examples of unidirectional communication signals that may be employed with embodiments of the invention;

FIG. 6 is a block diagram illustrating exemplary bi-directional data structures that may be employed in the invention;

DETAILED DESCRIPTION OF PREFERRED EMBODIMENTS

The disclosed invention solves the problems of the prior art by delivering contextually relevant information to a handheld device. As used herein, context is comprised of two parts. The first part is environmental, or locational context. Locational context refers to a physical location such as an isle in a department store, a seat in a sporting complex, or a conference room in an office building, or the like. The second part is referred to as a personal context as it relates to a user's interests. Examples of a personal context for a particular user are books by a particular author, a particular size or style of clothing, and departure times for flights to a particular destination. Embodiments of the disclosed invention may make use of both locational and personal context when making information available to a user of a handheld device. As previously noted, prior art techniques force the handheld device to determine context using onboard sensors or by performing complex processing tasks. In the disclosed invention, locational context is pushed to the handheld device. Pushing locational context using the network infrastructure lets a service deliver relevant content to wireless users while greatly reducing the processing and power demands placed on a handheld device.

To aid the reader in understanding the disclosed invention, examples are periodically used herein. These examples are intended to be illustrative and non-limiting; therefore, the examples should not be construed in a manner that limits the scope of disclosed embodiments or alternative embodiments in any way.

Figure 1A:
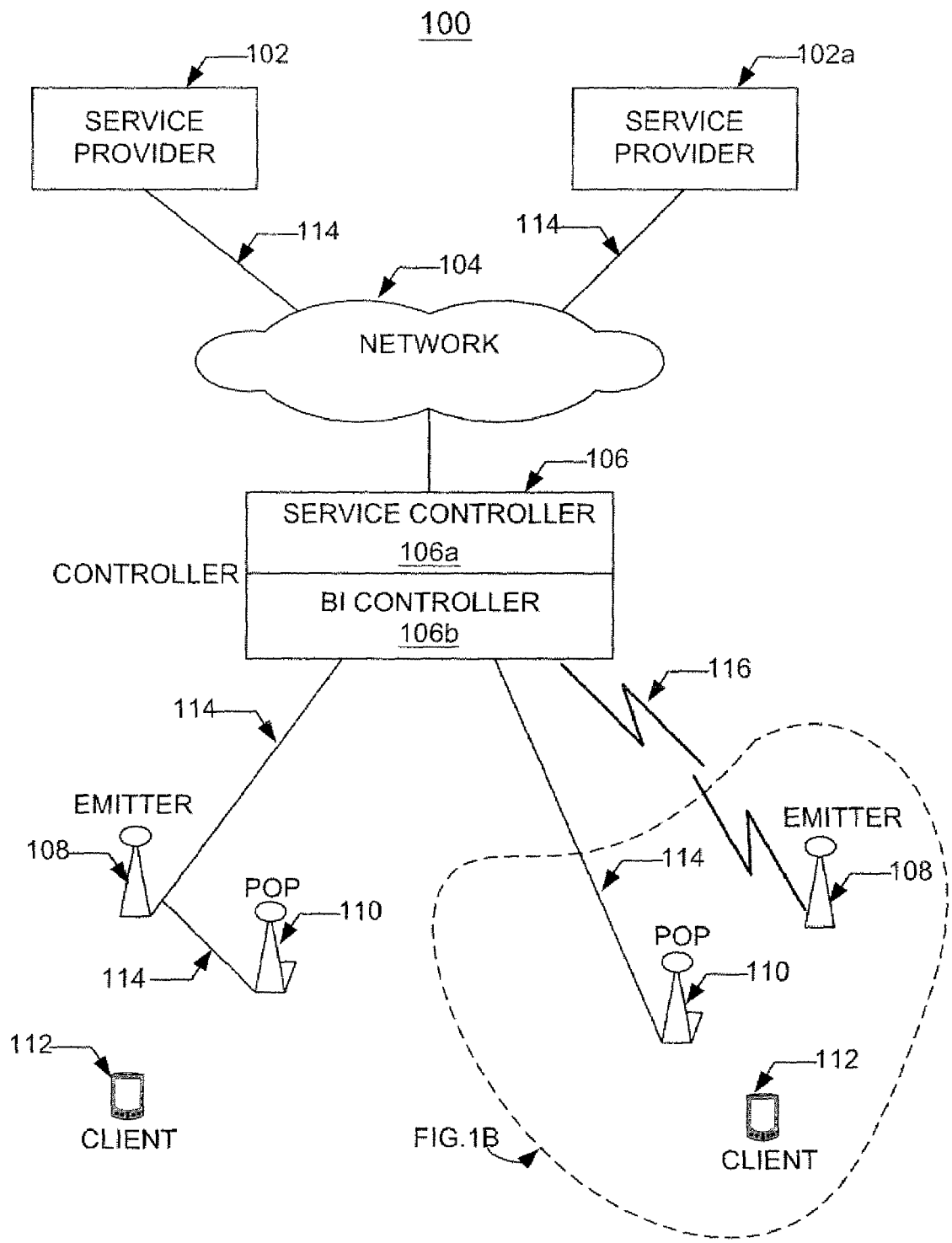
FIGS. 1A and B are schematic diagrams of a system for transmitting context to a handheld device.

FIG. 1A illustrates an overall architecture that may be used for practicing disclosed embodiments of the invention. In particular, FIG. 1A shows system 100 comprising service providers 102, 102a, network 104, controller 106 comprising broadcast information (BI) controller 106b and service controller 106a, one or more emitters 108, one or more points-of-presence (POPs) 110, and one or more client devices 112. As used herein client, or client device, will be used to identify a handheld device capable of receiving contextually relevant information, and user will identify a person operating a client or making use of information contained in a client device.

Service provider 102 is communicatively coupled to network 104 by link 114. Service provider 102 is an entity wishing to provide a service to client device 112. Typically, service provider 102 will include a computer executing software enabling it to provide services of interest to a user of client 112. Examples of services that may be provided are, but are not limited to, credit card purchase validations, online catalogs, online banking information, travel planning information, medical information and the like. Additionally, service provider 102 may operate individually to provide services to a user, or alternatively, it may operate in concert with other service providers when servicing a user.

Links 114 are communication media allowing devices coupled to network 104 to communicate with one another. Typically, links 114 may be comprised of optical fiber; however, they may also be comprised of coaxial cable, twisted pair wire, an RF link 116, or the like.

Network 104 may be comprised of a plurality of links 114 or 116 and network components (not shown) for facilitating the movement of communication signals from an originating point to a termination point. Examples of network components that may be used in conjunction with links 114 and 116 for facilitating communications are, but are not limited to, routers, switches, bridges, gateways, firewalls, and the like. For many embodiments of the invention, network 104 will be comprised of a public network such as the Internet employing transport control protocol/Internet protocol (TCP/IP) However, the invention is not limited to a single network, nor is it limited to a particular type of network or to a network operating with a single protocol. For example, the invention may be practiced with private networks such as virtual private networks (VPNs), or local area networks (LANs) coupled to a public network such as the Internet. In addition, network 104 may operate with virtually any network protocol such as asynchronous transfer mode (ATM), synchronous optical network (sonet), frame relay, or the like, or, alternatively, network 104 may operate with wireless protocols such as code division multiple access (CDMA), time division multiple access (TDMA), wireless Ethernet, or the like. Thus the invention is very flexible with respect to network implementations and protocols.

In FIG. 1A, network 104 conveys data from service provider 102 to controller 106. Although network 104 is shown coupling service provider 102 to controller 106, it may also connect controller 106 to emitter 108 and to POP 110 in other embodiments.

Controller 106 may be comprised of a computer executing software for providing the functionality of a service controller 106a and a broadcast information controller 106b. It is noted that controller 106 may incorporate additional functionality and it may be implemented in a distributed fashion rather than as the single entity shown in FIG. 1A. Service controller 106a ensures that data exchanges between service provider 102 and controller 106 are properly handled. For example, service controller 106a may perform error detection and correction, data encryption, transport protocol conversion, and the like. Service provider 102 and service controller 106a may communicate using any mutually agreed upon data protocol.

Broadcast information controller 106b handles the distribution of broadcast information, referred to as a broadcast to emitter 108 and POP 110 for distribution to client 112. As used herein, the term broadcast, or broadcast signal, denotes a one-way communication signal going from an originating location to a terminating location. Broadcasts may be directed to a single termination point, for example to a specific emitter in a known location, or they may be transmitted to a plurality of termination points. Furthermore, broadcast signals may be conveyed over a wire line communication medium or a wireless communication medium. In a preferred embodiment, broadcasts are comprised of a series of eXtensible markup language (XML) elements containing information of interest to a user of client 112. Use of XML elements in conjunction with embodiments of the invention will be later described herein.

Figure 1B:
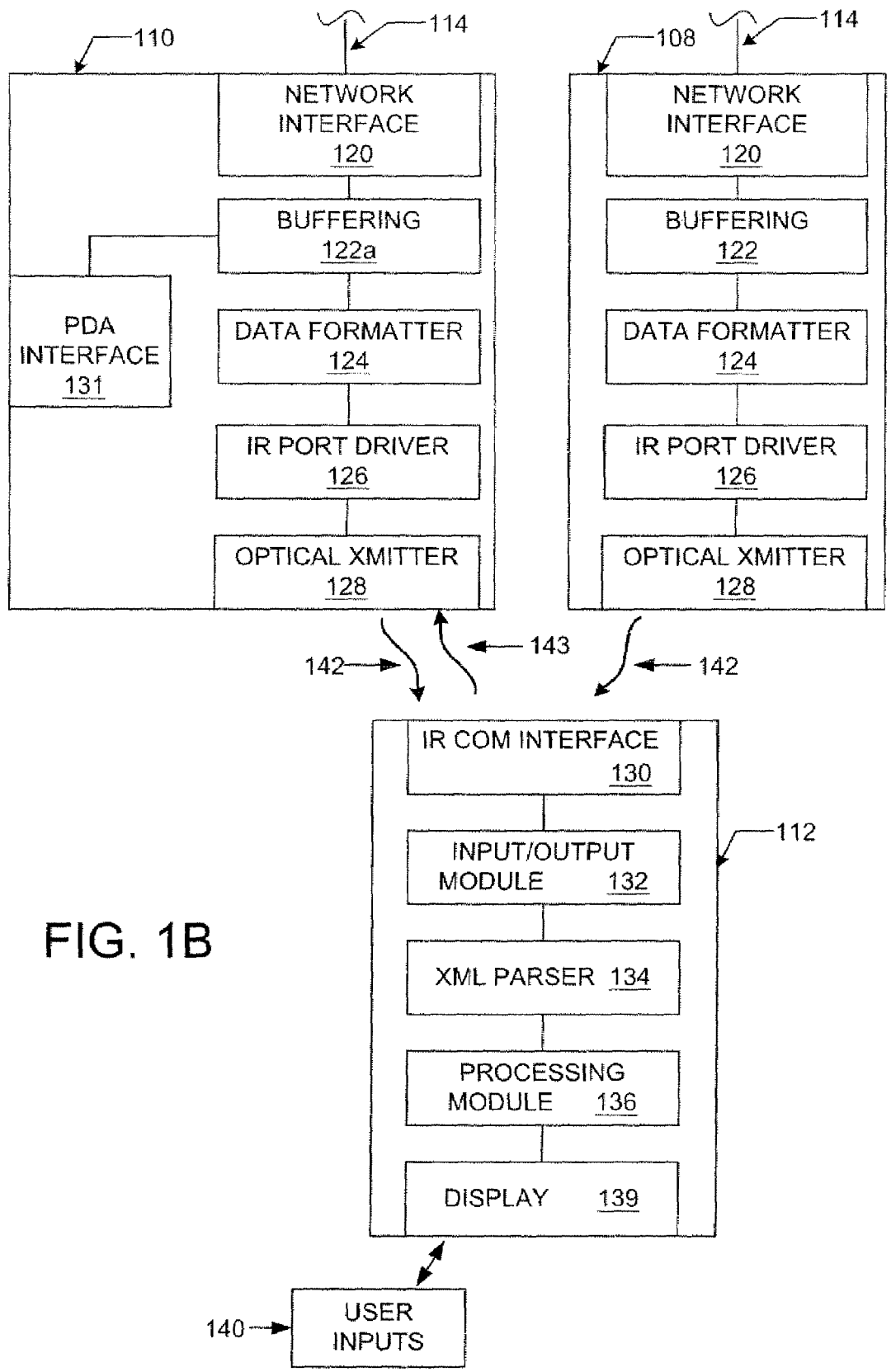

FIG. 1B provides a more detailed illustration of emitter 108, POP 110 and client 112 shown in FIG. 1A. The primary distinction between emitter 108 and POP 110 is that emitter 108 performs one-way wireless transmission to client 112 whereas POP 110 performs one-way wireless transmission to client 112 and in addition, may perform two-way communications with client 112. In the foregoing discussions, emitter 108 will be used to describe and reference the hardware, software, and methodology associated with performing one-way wireless transmission. As such, it is intended that emitter 108 will also refer to the one-way wireless transmission capabilities of POP 110.

Emitter 108 may receive a broadcast containing XML elements from controller 106 before converting it into a wireless communication signal for transmission to client 112. In a preferred embodiment, emitter 108 conveys information to client 112 via optical radiation. Typically, emitter 108 is placed at a known location and is designed to have a given coverage area. As used herein coverage area refers to the volumetric region that a broadcast penetrates, for example a room, stadium, or store isle. More specifically, for a given emitter 108, the coverage area defines the space over which client 112 can receive the broadcast signal and hence locational context information contained therein.

To assist the reader in understanding operation of the disclosed invention, a general non-limiting example will be used through out the specification. In this example, an airline will comprise service provider 102. Operation of the airline as a service provider will be discussed in conjunction with operation of selected embodiments of the invention. The example will further include locational contexts such as B-wing at Logan Airport and particular gate areas. In addition, the example will include personal context items such as flight numbers and seat numbers.

Using the airline example, emitter 108 may be located in a particular wing of an airport, here B-wing of Logan Airport. Furthermore, emitter 108 may be designed to transmit a signal over a specified area, here the waiting area for B-wing at Logan. Furthermore, the airline may transmit a signal to controller 106 containing information about all departures from B-wing leaving within a certain interval of time. Controller 106 may formal departure information into one or more XML elements and transmit them as a broadcast to an emitter 108 located in the B-wing waiting area. Emitter 108 then transmits the departure information to a client 112 located within the waiting area of B-wing. A user of client 112 may then make travel arrangements based on the displayed contextually relevant information.

Returning to FIG. 1B, in conjunction with FIG. 1A, emitter 108 and POP 110 are comprised largely of the same hardware and software components. The primary distinction between the two is that POP 110 can receive transmissions from client 112 over PDA interface 131. PDA interface 131 may be an electromechanical interface, such as a bus or connector, or it may receive a wireless reply signal 143 from client 112. Like emitter 108, POP 110 may be placed at a known location, have a defined coverage area, and may transmit a wireless signal such as an optical signal.

Network interface 120 receives a broadcast signal from controller 106 via link 114 or wireless link 116. Next, buffer 122, 122a may buffer incoming data to balance variations between the data rate at network interface 120 and optical transmitter 128 to prevent overwriting data awaiting transmission from emitter 108. In addition, buffer 102a performs buffering of data received at PDA interface 131 before placing it on link 114. Data formatter 124 receives data from buffer 122, 122a and performs data conversions needed to transform the received broadcast into a signal compatible with IR communications interface 130 on client 112. For example, data formatter 124 may convert a received broadcast into a format for optical transmission to client 112. From data formatter 124, the signal goes to infrared (IR) port driver 126. IR port driver 126 performs amplification and signal conditioning necessary for transmission of broadcast signal as optical radiation. Optical transmitter 128 receives formatted broadcast data from IR port driver 126 and transmits it as an optical signal 142 to client 112.

Client 112 may be comprised of a handheld wireless device. Client 112 may be equipped with one or more types of wireless communication means such as an optical transceiver, cellular transceiver, or other RF transceiver such as IEEE 802.11 or Bluetooth™. Most often, client 112 will be a commercially available personal digital assistant (PDA) such as the PALM COMPUTING® environment from Palm, Inc., or a handheld computer such as IPAQ™ BLACKBERRY®. As used hereinafter, PDA and client 112 will be used to refer to handheld devices used in practicing embodiments of the invention. Client 112 may be comprised of an IR communication interface 130, a input/output module 132, an XML parser 134, a processing module 136 and display 139.

IR communication interface 130 receives optical signal 142. The received signal is converted from optical to electrical form and sent to input/output module 132. Input/output module 132 performs signal demodulation, amplification and filtering for incoming signals and performs the inverse for outgoing data. Next, the received signal is passed to XML parser 134, which breaks the signal into its component parts for use by processing module 136. Processing module 136 performs processing necessary to get the received data into a form useful to a user of client 112. From processing module 136, the received data is displayed to a user of client 112 by display 139. User inputs 140 can be entered into client 112 through display 139 using a stylus, touch sensitive display, or the like.

Returning again to the airline example, information displayed to a user in B-wing at Logan Airport may indicate the gate numbers and corresponding departure times for flights leaving B-wing. User inputs 140 may be accepted by display 139 and locally processed on client 112 or they may be formatted and transmitted to POP 110 via PDA interface 131.

Figure 2:
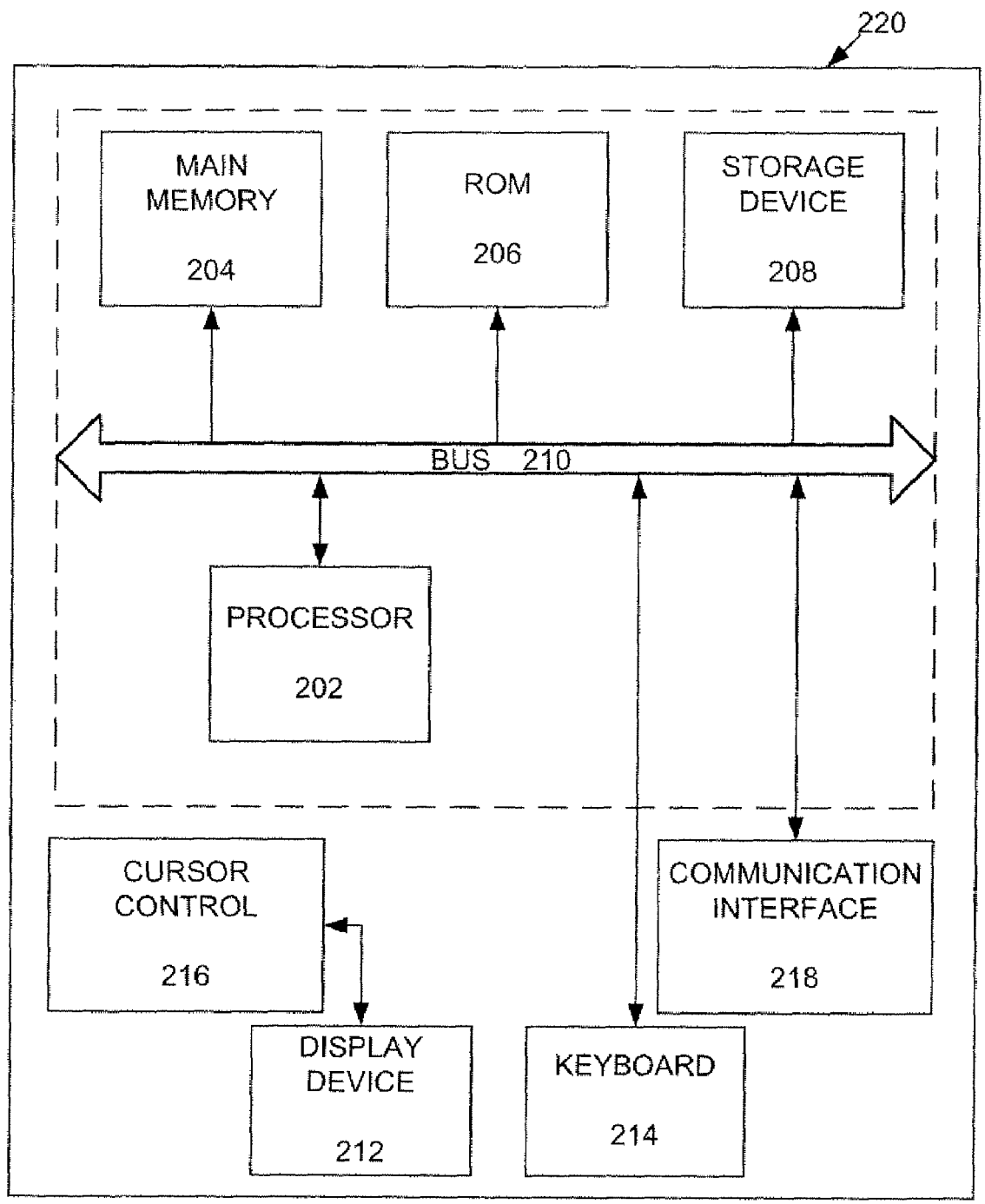
FIG. 2 is a schematic diagram of a general purpose computer that may be configured to practice embodiments of the invention.

FIG. 2 illustrates an exemplary computer 220 on, or with, which embodiments of the disclosed invention may be used, namely service provider 102, controller 106, emitter 108, POP 110 and client 112. In FIG. 2, exemplary computer 220 includes a processor 202, main memory 204. read only memory (ROM) 206, storage device 208, bus 210, display device 212, keyboard 214, cursor control 216, and communication interface 218.

Processor 202 may be any type of conventional processing device that interprets and executes instructions. Main memory 204 may be a random access memory (RAM) or a similar dynamic storage device. Main memory 204 stores information and instructions for execution by processor 202, and main memory 204 may also be used for storing temporary variables or other intermediate information during execution of instructions by processor 202. ROM 206 stores static information and instructions for processor 202. It will be appreciated that ROM 206 may be replaced with other types of static storage devices known in the art. Data storage device 208 may include any type of magnetic or optical media and corresponding interfaces, operational hardware, and carrier-waves. Data storage device 208 stores information and instructions for use by processor 202. Bus 210 includes a set of hardware lines (conductors, optical fibers, or the like) that allow for data transfer among components of computer 220.

Display device 212 may be a cathode ray tube (CRT), or the like, for displaying information to a user. Keyboard 214 and cursor control 216 allow a user to interact with computer 220. Cursor control 216 may be, for example, a mouse. In an alternative configuration, keyboard 214 and cursor control 216 may be replaced with a microphone and voice recognition means to enable a user to interact with computer 220 in a hands free manner. For embodiments of computer 220 used in POP 110 and emitter 108, display 212, keyboard 214 and cursor control 216 will normally be omitted. Furthermore, for embodiments of computer 220 used in client 112, keyboard 214 and cursor control 216 may be replaced with a stylus (not shown) and a touch sensitive embodiment of display 139.

Communication interface 218 enables computer 220 to communicate with other devices or systems via any communications medium. For example, communication interface 218 may be a modem, an Ethernet interface to a LAN, an optical radiator, an RF transmitter, a printer interface, or the like.

Computer 220 may be adapted and modified to fulfill requirements associated with embodiments such as service provider 102, controller 106, emitter 108, POP 110 and client 112. For example, computer 220 may be embodied as a network server at service provider 102 or controller 106 for facilitating communications over network 104. In emitter 108 or POP 110, computer 220 may be embodied as an application specific processor for receiving data from controller 106 and formatting it into a wireless signal for transmission to client 112. In client 112, computer 220 may be embodied in a configuration minimizing size and power consumption at the expense of processor speed and system memory. As can be seen, computer 220 is adaptable using techniques known in the art for practicing embodiments of the disclosed invention.

Controller 106 serves as the interface between service provider 102, emitter 108, and POP 110. The primary purpose of controller 106 is to receive data from service provider 102 and make it available to emitter 108 in a format easily transmitted to client 112. In addition, data received at client 112 is formatted in such a way that client 112 can extract relevant information without undue processing. Controller 106 performs its function by receiving service-provider-data at service controller 106a. Service controller 106a then passes the service-provider-data to broadcast information controller 106b. Broadcast information controller 106b is responsible for placing service-provider-data into a message format that is easily processed by client 112.

In most embodiments of the invention, emitter 108 will operate essentially as a data repeater with respect to broadcast information received from controller 106. As a repeater, emitter 108 converts data present at network interface 120 into optical radiation at optical transmitter 128. When operating as a repeater, emitter 108 may not perform any additional processing on broadcast information messages, other than performing routine error detection and correction. Emitter 108 operating in this capacity is referred to as a dumb emitter. Use of a dumb emitter makes it possible to deploy less costly wireless networks for sending information to client 112.

When a dumb emitter is used, the data structures sent from controller 106 to emitter 108 will appear at the output of optical transmitter 128. Broadcast information controller 106B formats data into a series of structured XML elements prior to making them available to emitter 108. The use of XML elements for carrying data to client 112 facilitates efficient processing and extraction of information contained therein when received at client 112.

In a preferred embodiment of the invention, contextual information is efficiently provided to client 112 using XML elements and/or XML documents. An XML document is comprised of data and tags. Data is the actual content within a document and an example of data is character text. Tags are used to denote the structure, or format, of data within an XML document. XML elements serve as the fundamental components of an XML document and they may contain data or other elements, referred to as sub-elements. Since elements are often nested, the term root element is used to identify the element that is not contained within any other element in a given XML document.

In an XML document, tags are surrounded by markups which are open and closed brackets, "<" and ">", respectively. Tags serve as handles for identifying elements within an XML document. For example, a tag for identifying an airline may appear as <airline>. As such, tags make XML documents easy to parse using readily available parsers. When elements are parsed, other software routines, modules, or applications may use the data contained in, or referenced by them.

Referring to the airline example, an airline acting as service provider 102 may employ tags within one or more XML documents associated with available services, namely particular flights. An exemplary, and non-limiting, hierarchy of tags for an XML document may appear as:

```
<airline name>
    <airport name>
        <airport wing>
            <gate number>
                <flight number>
                    <seat number>
```

From the example, it can be seen that airline name is the root element and the sub-elements below it describe aspects about the service in greater and greater detail. If sending contextual information to a user located at a particular gate, e.g. gate 16 in the B-wing of Logan Airport, the tags facilitate parsing by the infrastructure (controller 106 and emitter 108) so the user receives only relevant information.

Broadcast information is comprised of three primary XMIL element types, hereinafter referred to as BI XML elements.

FIG. 3 presents exemplary BI XML elements, which include a banner element 302, a service element 304, and a context element 306. BI XML elements are unidirectional communication signals in that they travel in only one direction, namely from controller 106 to emitter 108 and then to client 112. Banner element 302 may be used for making a ticker tape like display appear on display 139 of client 112. When client 112 receives banner element 302, any information contained therein is displayed to a user of client 112. Since the location and coverage area associated with emitter 108 are used to control distribution of information only to areas where it is contextually relevant, client 112 does not perform any processing on banner element 302 to discern its contents. As such, any banner element 302 received at client 112 will be displayed to a user. Typically, banner element 302 is useful for making brief messages available to client 112.

Returning to the airline example, banner element 302 may be used to display flight numbers and departure gates to a user located within the coverage area of the emitter in B-wing at Logan.

Although banner element 302 is primarily used for making brief messages available to client 112, it is not limited to those. For example, a number of banner elements 302 may be used to make substantially continuous messages available to client 112. Such a continuous banner message may occur, for example, if a speaker's presentation is converted to text for display to clients 112 located within the coverage area of one or more emitters 108 associated with the presentation.

Service element 304 may be used to provide electronic services to client 112 located within a particular context. Service element 304 typically describes a service that is available to a user located within a particular context. More specifically, service element 304 dynamically describes a service to client 112. When received at client 112, service element 304 contains enough information to uniquely identify the offered service and to provide information needed for contacting the service.

Returning to the airline example, service element 304 may provide a client 112 within B-wing with electronic forms allowing them to change flights, obtain boarding passes, reserve concierge services, etc.

Context element 306 is very versatile. The specific structure and content of context element 306 depends on the environment that emitter 108 is deployed in. Context element 306 may serve as a wrapper around other BI XML elements. For example, context element 306 may be used to encapsulate another BI XML element such as banner element 302 or service element 304. When used to encapsulate another BI XML such as banner element 302, context element 306 provides a mechanism for allowing client 112 to discern if it wants to make the information in the banner display available to a user.

Returning to the airline example, encapsulating a banner element 302 for indicating departures times and gates in a context element 306 directed to showing flights with available seats provides client 112 with a means for only displaying departures having available seats to a user wanting such information.

Employing unidirectional signals such as BI XMl elements may pose problems, namely error detection and correction at a receiving device such as emitter 108 or client 112. The disclosed invention overcomes this shortcoming by performing error detection for unidirectional signals using a special type of XML element called an integrity element. An integrity element is used by the infrastructure, such as emitter 108, or by client 112 to ensure proper reception of BI XML elements. In a preferred embodiment of the invention, each root XML element may be encapsulated in an integrity element when transmitted from controller 106 to emitter 108 or client 112.

Figure 4A:
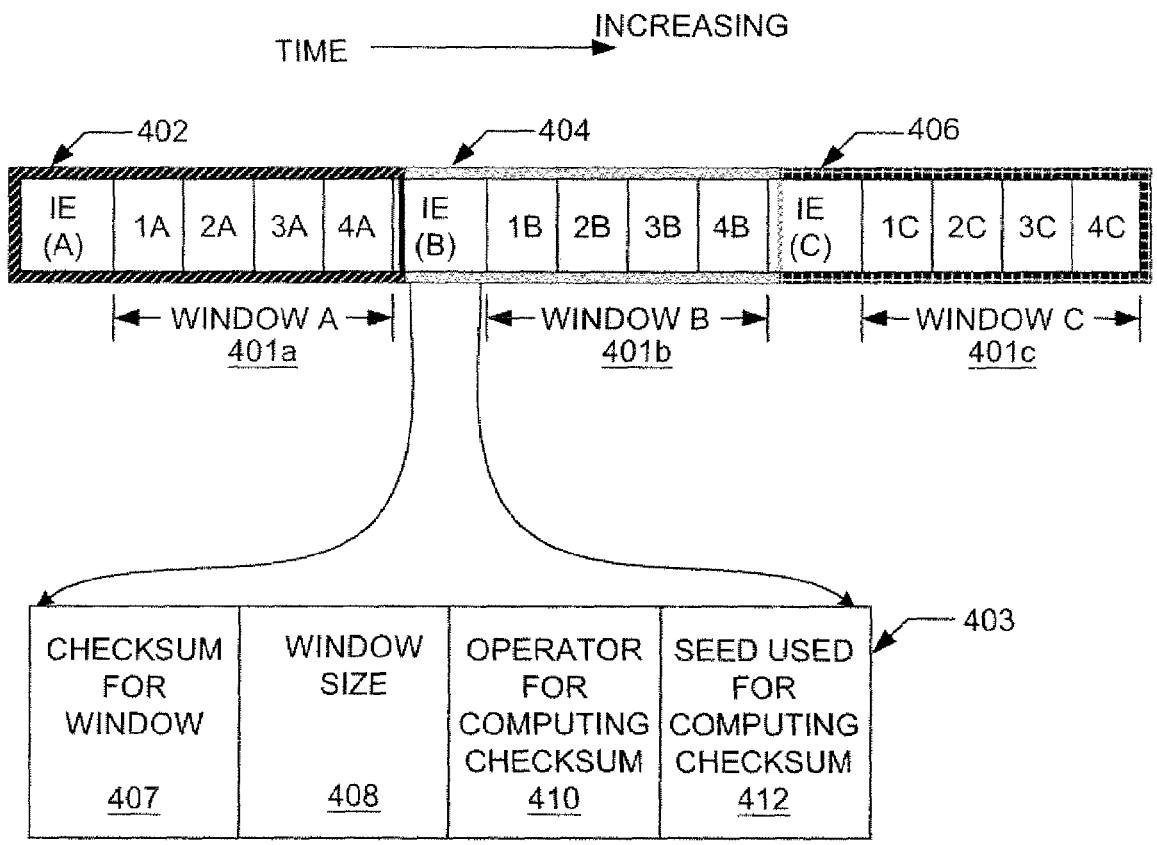
FIGS. 4A and B are schematic diagrams showing an exemplary data signal that may be received by a client.

FIG. 4A illustrates integrity element 402, 404 and 406 which is used to perform error detection for BI XML elements. Exemplary BI XML elements are shown as bytes 1A-4A, 1B-4B and 1C-4C which are grouped into window A 401a, window B 401b, and window C 401c, respectively. The bytes are comprised of bits of data containing information from service provider 102. Information may be comprised of an advertisement for a service provided by service provider 102 or, alternatively, information may include the service itself as executable code or equivalent. The grouping of BI XML bytes located within an integrity element is referred to as a window, or frame.

Broadcast information controller 106b may parse an exemplary message into bytes 1A-4A, 1B-4B, 1C-4C for transmission to emitter 108. Then, broadcast information controller 106b encapsulates the resulting windows 401a, 401b, 401e with integrity clement 402, 404, 406, respectively. Integrity element 402, 404, 406 may contain a header 403 having a checksum value 407, a window size 408, an operator 410, and a seed 412. Cheeksum value 407 is computed over the bytes making up a respective window 401a, 401b, 401c using known techniques such as exclusive ORing (XORing) each byte with its neighbor. As such, checksum value 407 uniquely identifies the contents of the window 401a, 401b, 401c over which it was computed. Window size 408 identifies the number of bytes that checksum value 407 was computed over. Operator 410 identifies the mathematical operator used to compute checksum value 407, and seed 412 identifies the seed value used for computing the first value used when computing checksum value 407. Seed 412 may be set to zero if no seed value is used.

Here it is noted that a time element (not shown in FIG. 4), or timestamp, may be included in window 401a, 401b, 401c. If used, a time element contains data allowing emitter 108, POP 110 or client 112 to determine a time relative to some reference. For example, a time element may provide time with respect to Greenwich Mean Time (GMT), a master clock within network 104, or a timer within emitter 108. Use of a time element further enhances the context associated with client 112 because it allows client 112 to establish a temporal context in addition to the locational and personal context already described herein.

Figure 4B:
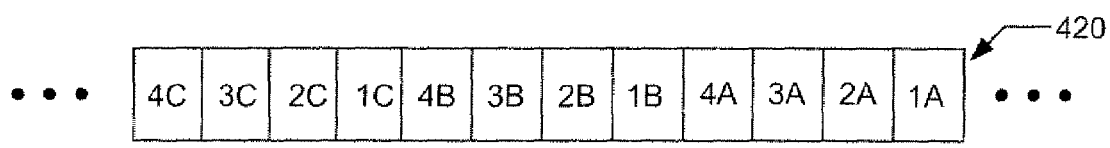

FIG. 4B illustrates the resulting broadcast information stream 420 inside client 112 after integrity elements 402, 404 and 406 have been removed by XML parser 134. The details associated with receiving and extracting integrity elements from a received signal will be discussed in more detail in conjunction with the detailed description of client 112 discussed later herein. When integrity elements 402, 404 and 406 are removed, the original data stream containing banner elements 302, service elements 304, context elements 306, or other data remain. The ellipses used in FIG. 4B indicate that the broadcast information stream 420 may be substantially endless i.e. it may continue beyond that shown in FIG. 4B.

In more complex embodiments of the invention, emitter 108 may be configured to accept messages in virtually any format. If configured as such, emitter 108 may be equipped with processing hardware and software for converting incoming data into an XML based message for transmission to client 112.

As shown and discussed in conjunction with FIG. 1B, emitter 108 contains the hardware and software necessary to convert electrical signals into optically radiated signals. When setting up an infrastructure for practicing the invention, placement of emitters 108 and POPs 110 is very important because their respective coverage areas determine the locational context for clients 112 located therein. Since emitter 108 may be configured as a dumb emitter, having essentially no processing capability or configured as a smart emitter having processing capability, they provide a network designer with great flexibility.

Dumb emitters are small in size and inexpensive to build, therefore they can be deployed in larger numbers, thus allowing for smaller coverage areas within a given environment. Use of small coverage areas allows the infrastructure to better refine the locational context associated with a given emitter 108. Refined locational context allows relevant information to be provided to a user in a more reliable manner.

Returning to the airline example, if low cost emitters are deployed near each boarding gate in B-wing, then a user located within the coverage area of a gate emitter may only receive information dealing with departures from the respective gate. Using emitters with small coverage areas further reduces the processing demands on client 112 thus allowing less expensive and less capable PDAs to benefit from the invention.

Smart emitters may be incorporated where it is desirable to move the processing out of the infrastructure portion that includes controller 106 and place it into emitter 108. For example, it may be beneficial to employ smart emitters when a general-purpose network not employing BI XML elements is providing raw data to particular locations. When smart emitters are used they may employ virtually any communication protocol for receiving data from network 104 and controller 106. In such a configuration, emitter 108 receives raw data and performs necessary filtering and processing to extract contextually relevant information using data formatter 124. Data formatter 124 then converts the contextually relevant information into the necessary BI XML elements. Next, the information is passed to IR port driver 126 and then to optical transmitter 128 for transmission to client 112 as optical signal 142.

When transmitting optical signals to client 112, emitter 108 may employ virtually any waveform generated using known modulation methods. Examples of modulation methods usable for transmitting optical signals compatible with embodiments of the invention are, but are not limited to, baseband pulsing, frequency shift keying (FSK), amplitude shift keying (ASK), phase shift keying (PSK), pulse position modulation (PPM), or burst-PPM. In addition, emitter 108 may transmit optical signals of virtually any wavelength.

Although emitter 108 is very robust, it will normally be designed to leverage off of existing optical communication protocols and hardware used in client 112. Two of the most common optical communication protocols used in conjunction with inexpensive electronic devices, such as PDAs, laptop computers, cell phones, and the like, are those referred to as the diffuse optical communication protocol and the infrared-data-association (IrDA) communication protocol. Both of these protocols employ near infrared signals, where infrared denotes wavelengths of light that are too short for visual perception by humans.

The diffuse optical communication protocol is primarily used for setting up optical local area networks over small areas such as a classroom or auditorium. The primary distinction between diffuse optical communications and IrDA communications is that the former allows for many-to-many communications such as in a network and the later allows point-to-point, or one-to-one, communication. Advantages of diffuse optical signals are that they may offer either bi-directional or unidirectional communication capability. In addition, a diffuse optical signal can be used to accomplish communication when non-line-of-sight geometries are present. An example of a non-line-of-sight geometry is when a transmitter is located such that a straight line drawn from it to a receiver intersects a barrier before reaching the receiver. Such a geometry would exist if a cubicle wall was located between an optical transmitter attached to a ceiling and a laptop located on a desk within the cubicle.

Non-line-of-sight communications are possible because a diffuse optical signal can bounce off obstructions and thus be reflected to a receiver. Using the cubicle wall example, a diffuse signal can bounce off the ceiling and walls to reach the laptop even though a line-of-sight path from the optical transmitter to the laptop is not present. Diffuse transmitters normally use arrays of LEDs to transmit near-infrared signals having wavelengths in the range of 850 nanometers (nm) to 1250 nm. When used to accomplish one-way communications, a diffuse optical transmitter does not receive any acknowledgement from a receiver, thus ensuring reliable one-way communications is difficult unless the receiver has a clear line-of-sight path to the transmitter that is not likely to encounter any inferences that could distort received data.

The IrDA protocol was developed by a non-profit trade association representing companies that make computer and telecommunications hardware and software. The protocol is defined in an IrDA standard which is already employed in several million devices such as PDAs, laptops, and the like. As a result, leveraging off of IrDA capable devices is very desirable for implementing cost effective contextually relevant communication systems. As previously noted, IrDA protocol is for one-to-one optical communications that are directional in nature and occur over very short ranges. Specifically, IrDA transmitters have a beam that extends roughly ±15° from the main transmission axis. As a result, two IrDA devices must have their respective infrared data ports pointed toward each other for communications to occur. In addition, IrDA devices should be within 1 meter of each other to ensure reliable communication. Reliable communication using IrDA devices also requires that the devices perform handshaking when communicating.

Handshaking is used to describe the acknowledgements sent between communicating IrDA devices for ensuring reliable communication. The IrDA specification indicates proper handshaking requires that a device attempt to send data for at least 100 ms. If no acknowledgement is received after 100 ms, then the sending device may stop transmitting. Additionally, the IrDA standard also defines a media busy state. The media busy state requires that a device observe its IR port for 100 ms before transmitting if it has not already established a communication session with another device. If no signal is detected for 100 ms then the device waiting to transmit can begin sending infrared data. Like diffuse infrared signals, IrDA compliant signals typically have wavelengths between 850 and 1250 nm.

The IrDA standard also defines a protocol stack for facilitating communication by applications running on IrDA equipped devices. The protocol stack breaks the IrDA communication protocols into layers. Each layer deals with a manageable set of responsibilities and supplies needed capabilities to the layers above and below. The IrDA standard identifies both mandatory and optional protocol layers. Here the mandatory protocol layers will be discussed beginning with the bottom layer. The mandatory protocol layers are the physical layer, link access (LAP), link management (LMP), and information access service (IAS). Of the mandatory protocol layers, the physical layer and link layer are pertinent to an understanding of the disclosed invention and they will be further discussed.

The physical layer specifies the optical characteristics, the encoding of data, and the framing of data for various speed communications. It includes the optical transceiver, deals with the shaping of the optical signals, handles the encoding of bits within a transmitted signal, and handles the beginning of frame (BOF), end of frame (EOF) flags, and cyclic redundancy checks (CRCs). Normally the physical layer is implemented in a combination of hardware and software; however it may be implemented solely in hardware if desired.

The LAP establishes the basic reliable connection; it receives data from and passes data to the physical layer. In order to isolate the LAP, and the layers above it from the hardware, a framer is employed between the physical layer and LAP. The framer is a software layer and it accepts incoming frames from the physical layer and makes them available to the LAP and does the reverse for transmitted data. The LAP corresponds to the open system interconnection (OSI) data link protocol and it is responsible for retransmissions, low level flow control, and error detection. Making the LAP responsible for reliable data transfer frees the upper layers from the task and ensures that reliable data will be delivered to the layers above the LAP.

The invention takes advantage of the benefits of the diffuse infrared protocol and the benefits of IrDA protocol while avoiding many of their respective shortcomings. In particular, the invention transmits diffuse infrared signals to a client 112 having an IrDA compliant bi-directional communication interface. The invention accomplishes communication by replacing the diffuse link layer with an IrDA compliant link layer. Since the physical layers are essentially the same for diffuse infrared and IrDA compliant systems, compatible link layers make it possible for received data to be handled by client 112.

In client 112, conventional IrDA protocol layers above the link layer are designed to handle two-way communication. If left in place, these layers would interfere with the reception and processing of unidirectional infrared signals at client 112. The invention solves this problem by replacing layers above the link layer with software modules designed to process unidirectional signals. Discussion of the software modules used to process unidirectional signals in client 112 will be further discussed in conjunction with the detailed description of client 112 later herein.

The invention also utilizes a unique transmission scheme that allows IrDA compliant communications to occur when diffuse infrared transmissions are not being received at client 112. Gated transmissions from emitter 108 are used to facilitate IrDA-to-IrDA communications when client 112 is not receiving signals from emitter 108.

Figure 5:
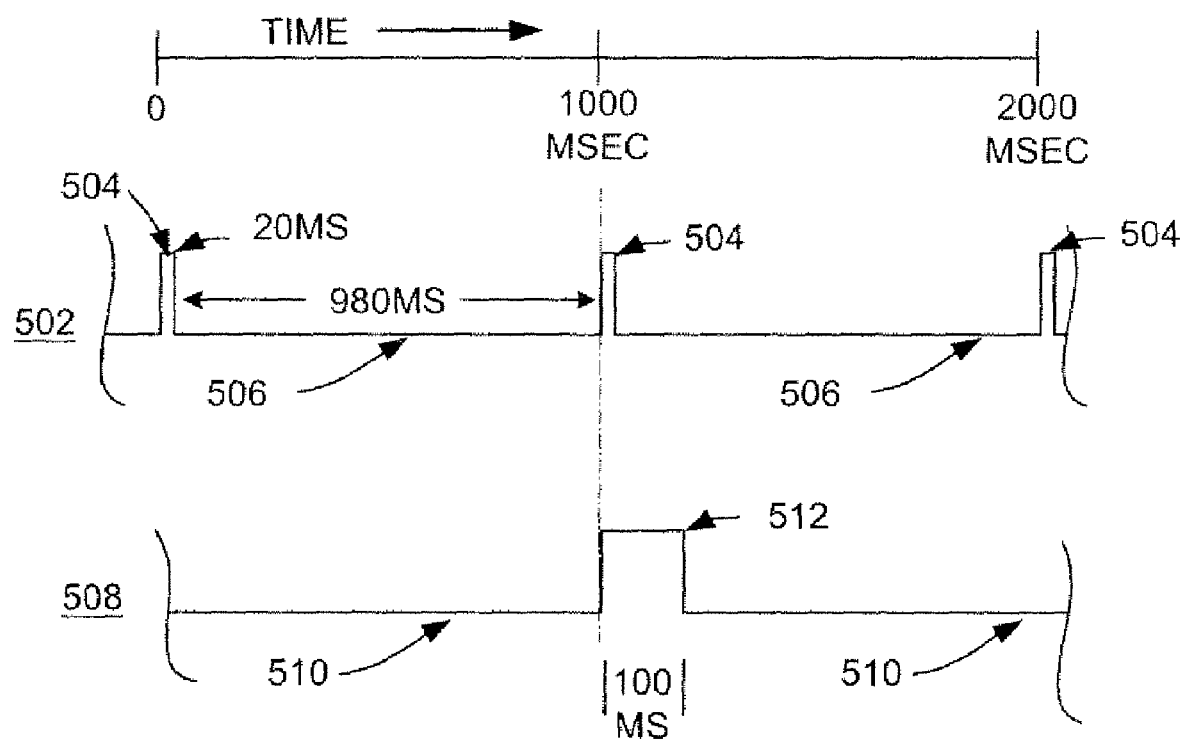
FIG. 5 is a timing diagram illustrating the relationship between signals that may be used with embodiments of the invention.

FIG. 5 illustrates a diffuse signal and an IrDA retry interval as used in an embodiment of the invention. In particular, FIG. 5 shows a diffuse infrared emitter signal 502 having an emitter-on-interval 504 and an emitter-off-interval 506, and an IrDA compliant client-retry-signal 508 having a retry-on-interval 512 and a retry-off-interval 510.

Emitter signal 502 is comprised of 20 ms emitter-on-intervals 504 separated by emitter-off-intervals 506. In a preferred embodiment, emitter-off-interval 506 is 980 ms in duration, resulting in one emitter-on-interval every second. Emitter signal 502 transfers data to a receiving device, such as client 112, during emitter-on-interval 504, and does not transfer data to a receiving device during emitter-off-interval 506.

Client-retry-signal 512 may occur in periodic pulse trains as needed to maintain IrDA-to-IrDa communications between two client devices. As shown in FIG. 5, retry-on-interval 512 is 100 ms in length in compliance with the IrDA standard. If emitter-on-interval 504 is present at IR communication interface 130 when a client 112 is receiving data, then the two pulses will only overlap by 20 ms in a worst case scenario. A 20 ms overlap provides client 112 with 80 ms to establish, or reestablish, communications with another IrDA compliant device. In most applications 80 ms is sufficient to allow client 112 to reestablish communication. As such, the presence of emitter signal 502 at IR communication interface 130 when client 112 is attempting to transmit or receive will not significantly degrade IrDA-to-IrDA communications.

Limiting emitter signal 502 to 20 ms pulses may increase the time needed to convey a complete message to client 112 using the invention; however, the additional time needed will not generally be apparent to a user of client 112. If desirable, emitter-on-interval 504 may be increased in length and/or emitter-off-interval 512 may be shortened to provide higher data communication rates if some additional delay in IrDA-to-IrDA communications can be tolerated. Thus the disclosed emitter signal 502 is very versatile for facilitating communications between a diffuse infrared transmitter and an IrDA compliant client 112.

As previously discussed herein, the distinguishing feature between POP 110 and emitter 108 is that POP 110 has a PDA interface 131 for allowing client 112 to communicate with POP 110 or service provider 102. Since POP 110 transmits locational context in addition to receiving client data, it will often be located in areas frequented by client 112. Therefore, the physical configuration of POP 110 can be such that it facilitates usage by client 112. In one embodiment of the invention, POP 110 can take the form of a kiosk. A kiosk is an unattended structure designed to facilitate user interaction therewith. As used herein, a kiosk provides client 112 with connectivity to network 104. When deployed as a kiosk, POP 110 may have a PDA interface 131 that is an electromechanical interface for exchanging data with client 112. An electromechanical interface allows client 112 to plug into an electrical connector over which data is exchanged. In an alternative embodiment the electromechanical interface may be wireless interface. A wireless embodiment of PDA interface 131 allows client 112 to communicate with POP 110 using an RE or optical signal. POP 110 and client 112 may employ virtually any communication protocol for exchanging data using PDA interface 131; however, in a preferred embodiment client 112 uses XML based elements to accomplish bi-directional communication with POP 110.

As discussed herein, the invention employs both unidirectional and bi-directional communication signals to provide robust contextual communications between service provider 102 and client 112. Bi-directional communication signals are used by client 112 to communicate information to, and to receive information from, service provider 102.

FIG. 6 illustrates a set of exemplary bi-directional communication signals comprised of XML elements. The invention is not limited to the signals shown in FIG. 6; however the signals shown are useful for facilitating efficient communication in a preferred embodiment. The XML elements shown in FIG. 6 are broadcast information update data 602, client request data 604, service response data 606, client service proprietary communication data 608, service-to-service communication data 610, and miscellaneous data 612.

Broadcast Information Update (BIU) data 602 is used by controller 106 to track the status of emitter 108. For BIU data 602 to obtain data from emitter 108, the emitter must be configured to provide status information. Examples of useful status information that emitter 108 may provider are error data, status of optical transmitter 128, internal temperature data, and power consumption data. Other parameters may be tracked depending on the specific configuration of a system. In addition to tracking emitter status, BIU data 602 may be used to update smart emitters. For example, BIU data 602 can include software updates for data formatter 124 or BIU data 602 may include new encryption protocols for network interface 120. As can be seen, BIU data 602 provides an efficient way to monitor and update emitter 108.

Client request data 604 is an XML element generated on client 112. In client 112 services are represented as dynamically created software objects. Where a software object is a piece of software designed such that it accepts input data and makes output data available according to an agreed upon format. Software modules external to the object and wishing to communicate with it need only comply with the input data or output data format. External modules do not have to be concerned with the internal workings of the software object. Employing software objects enables a software developer to re-use software objects in new environments without having to redevelop large amounts of software. Client request data 604 is generated after a user has interacted with a service object on client 112. After client 112 connects to POP 110 using PDA interface 131, client request data 604 is generated. An example of client request data 604 is information that a user of client 112 has entered in response to a banner display or other message displayed on display 139.

Returning to the airline example, if a banner message appears on display 139 indicating that a user's flight is cancelled, the user may be able to activate a flight change form by touching the banner display, or an icon associated therewith, using a stylus. Upon activating the flight change form, the user is asked to enter information such as new flight number, seating preferences, and payment method. Upon entering the information, the user plugs client 112 into POP 110 and sends the information to the airline. Client request data 604 is the XML element used to convey the entered information to the airline.

Service response data 606 is the XML element generated by a service provider in response to receipt of client request data 604. Depending on service provider 102, service response data 606 may contain executable code for delivery to client 112, a reply to a question asked by client 112, an alert for display on display 139, an icon for display on client 112, or the like. Typically, service response data 606 is only used during the initial contact between client 112 and service provider 102. For example, if an icon and executable code have previously been delivered to client 112, it may be desirable to have the icon and executable code associated with one another. If an icon and executable code are associated with one another, then a user may be able to activate a particular service by opening the associated icon for subsequent uses of the service.

Client Service Proprietary Communication (CSPC) data 608 is used by service provider 102 when communicating with client 112. For example, CSPC data 608 may be used to deliver executable code from service provider 102 to client 112 after a user has interacted with an icon associated with service provider 102. Use of CSPC data 608 allows service provider 102 and client 112 to interact in the most efficient manner based on the type of service employed or task being accomplished. As such, CSPC data 608 will not normally be comprised of XML elements. But rather, CSPC data 608 will employ industry standard communication protocols such as TCP/IP or it may use special communication protocols such as encryption when carrying data over insecure networks.

Service-to-service communication (SSC) data 610 is the XML element used when one service provider must use another service provider to accomplish an interaction initiated by client 112. While the service-to-service exchange will be based on the needs of client 112, the exchange itself does not have to involve client 112. In alternative embodiments of the invention, service-to-service exchange may be accomplished without using XML based elements or documents.

Returning to the airline example, if client 112 requests a new ticket by sending client request data 604 to the airline, the airline may need to charge the passenger's credit card. The credit card validation and charging would take place between the airline and the credit card company or a bank. As such, the airline and credit card company communication may be accomplished using SSC data 610.

Miscellaneous data 612 is an XML element used to handle exchanges other than those identified above. For example, miscellaneous data 612 may be used when a first client is communicating with a second client using one or more POPs 110. Miscellaneous data 612 may be used to exchange status data between two or more emitters 108 using link 114 or RF link 116. As can be seen, miscellaneous data 612 serves as a general-purpose bi-directional communication signal for embodiments of the invention.

As previously discussed, client 112 may be any type of portable computing device such as a PDA, handheld computer, or cell phone. Portable devices for use with the invention may take on many forms and have varying levels of sophistication. For example, portable devices may contain state of the art processors and large amounts of memory or, they may have relatively slow processors and limited memory. In addition, portable devices may have other wireless communication capabilities, in addition to bi-directional infrared communication interfaces. Examples of other wireless communication capabilities are wireless Ethernet and cellular. Portable devices compatible with the disclosed embodiments will also have various means for allowing a user to interact with the device. For example, a portable device may have a touch sensitive display, a keyboard, a microphone for digitizing voice commands, a trackball, or the like. Although portable devices used with disclosed embodiments will vary to a large degree, all of them will operate in essentially the same manner when used to receive contextually relevant information consistent with the methods disclosed herein.

Figure 7:
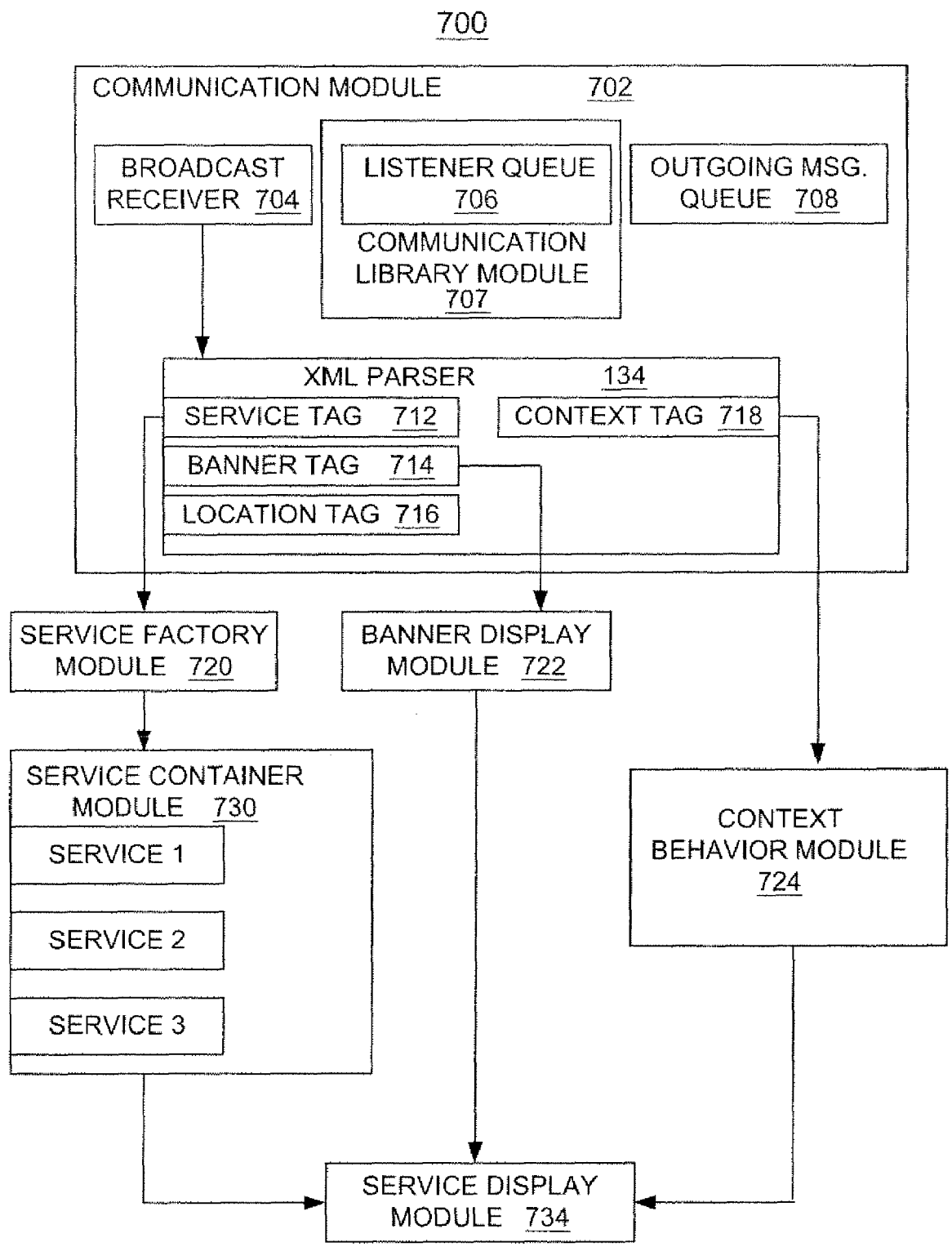
FIG. 7 is a schematic diagram illustrating exemplary client modules and their respective interconnections.

FIG. 7 illustrates the primary software modules and objects operating within client 112 (FIGS. 1A and 1B) for receiving and processing contextually relevant information. Client software configuration 700 may be comprised of a communication module 702 containing broadcast receiver 704; communication library module 707 containing listener queue 706; outgoing message queue 708; an XML parser 134 containing service tag 712, banner tag 714, location tag 716 and context tag 718; service factory module 720; banner display module 722; context behavior module 724; service container module 730 containing services 1, 2 and 3; and service display module 734. All of the modules receive inputs from other modules or send outputs to other modules using software communication means such as messages or the like.

Communication module 702 is responsible for receiving data from emitter 108 and sending data to POP 110 or other wireless device. As such, communication module 702 manages unidirectional and bi-directional communications to and from client 112. Referring back to FIG. 1B, communication module 702 may be implemented as part of input/output module 132 or IR communication interface 130 and it may include the functionality of XML parser 134.

Figure 8A:
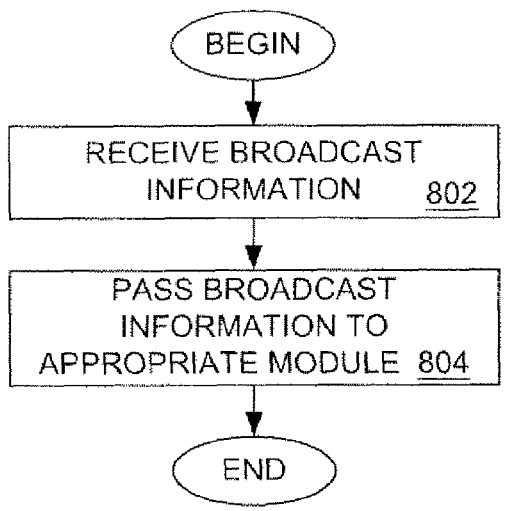
FIGS. 8A and B are flowcharts showing operation of a communication module operating in a client device.

FIGS. 8A and B contain flow diagrams showing the operation of communication module 702. In particular FIG. 8A illustrates a method for handling unidirectional data received at IR communication interface 130 and FIG. 8B illustrates a method for handling bi-directional communications.

In FIG. 8A, communication module 702 may receive incoming broadcast information via IR communication interface 130 and broadcast receiver 704 (step 802). After receiving broadcast information, communication module 702 passes it to XML parser 134. XML parser 134 parses the incoming message and removes integrity element 402. After removing integrity element 402, XML parser 134 passes the broadcast information to the appropriate module (step 804). For example, if banner element 302 is received by communication module 702 it will be passed to banner display module 722 if banner tag 714 is present. If service tag 712 is present, XML parser 134 passes the broadcast information to service factory module 720. If context tag 718 is present, XML parser passes the broadcast information to context behavior module 724. In addition, location tag 716 may be used to confirm the location of emitter 108 that is sending the message, or location tag 716 can be used in conjunction with location sensors in client 112, such as GPS, to help establish the position of client 112.

Figure 8B:
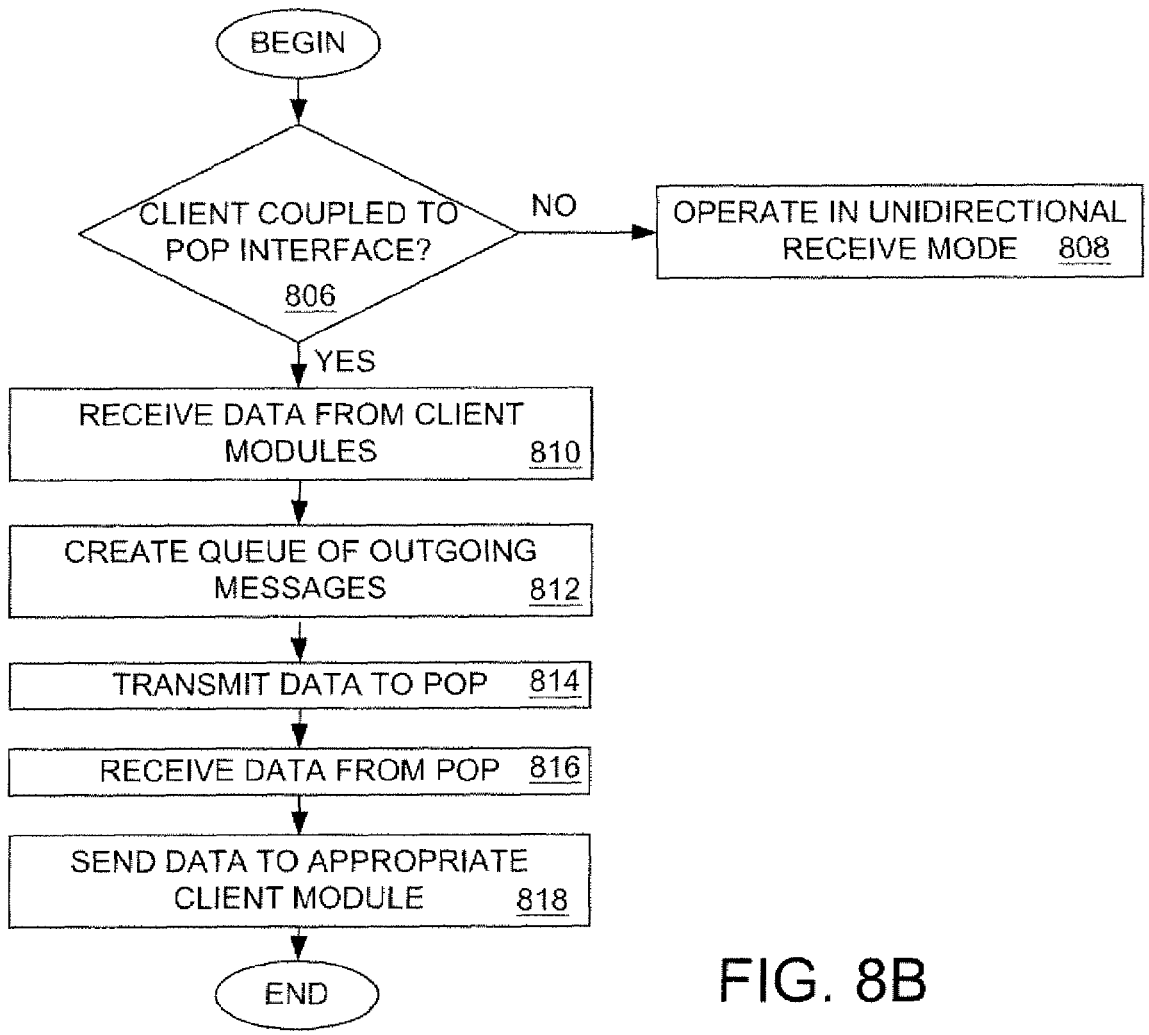

FIG. 8B begins with client 112 determining if it is connected to PDA interface 131 at POP 110 (step 806). If client 112 determines that it is not connected to PDA interface 131, the method stops and client 112 operates in unidirectional mode (step 808). Upon sensing that client 112 is connected to a bi-directional communications interface, communications module 702 receives data from software modules on client 112, such as service factory module 720 (step 810). Next, communications module 702 may create an outgoing message queue 708 (step 812) before transmitting the data to POP 110 (step 814). After transferring data to POP 110, communications module 702 receives data from service provider 102 via PDA interface 131 (step 816). The received data is passed to the appropriate software module on client 112 (step 818).

Returning to the airline example, if a user completes a form for ordering a new ticket, communication module 702 receives data from service display module 734 (step 810), queues the order message (step 812) and sends the order message to POP 110 via PDA interface 131 (step 814). Then, the airline processes the order and sends a confirmation and receipt to client 112. The confirmation is received at client 112 via PDA interface 131 (step 816) and it is passed to service display module 734 (step 732) for presentation to the user.

Additional processes occur within communication module 702 when performing the methods shown in FIGS. 8A and 8B. Before communication module 702 receives messages and distributes them to other software modules, the other software modules register with communication module 702. In particular, software modules interested in receiving data from communication module 702 register with a communication library module (CLM) 707 operating in conjunction with communication module 702. When modules register with communication module 702, listeners are created for each module and maintained in listener queue 706. When communication module 702 receives a message it looks for a listener registered for the particular message type. If no registered listener is found in listener queue 706, the message is ignored or overwritten when new data is received by communication module 702.

Figure 9:
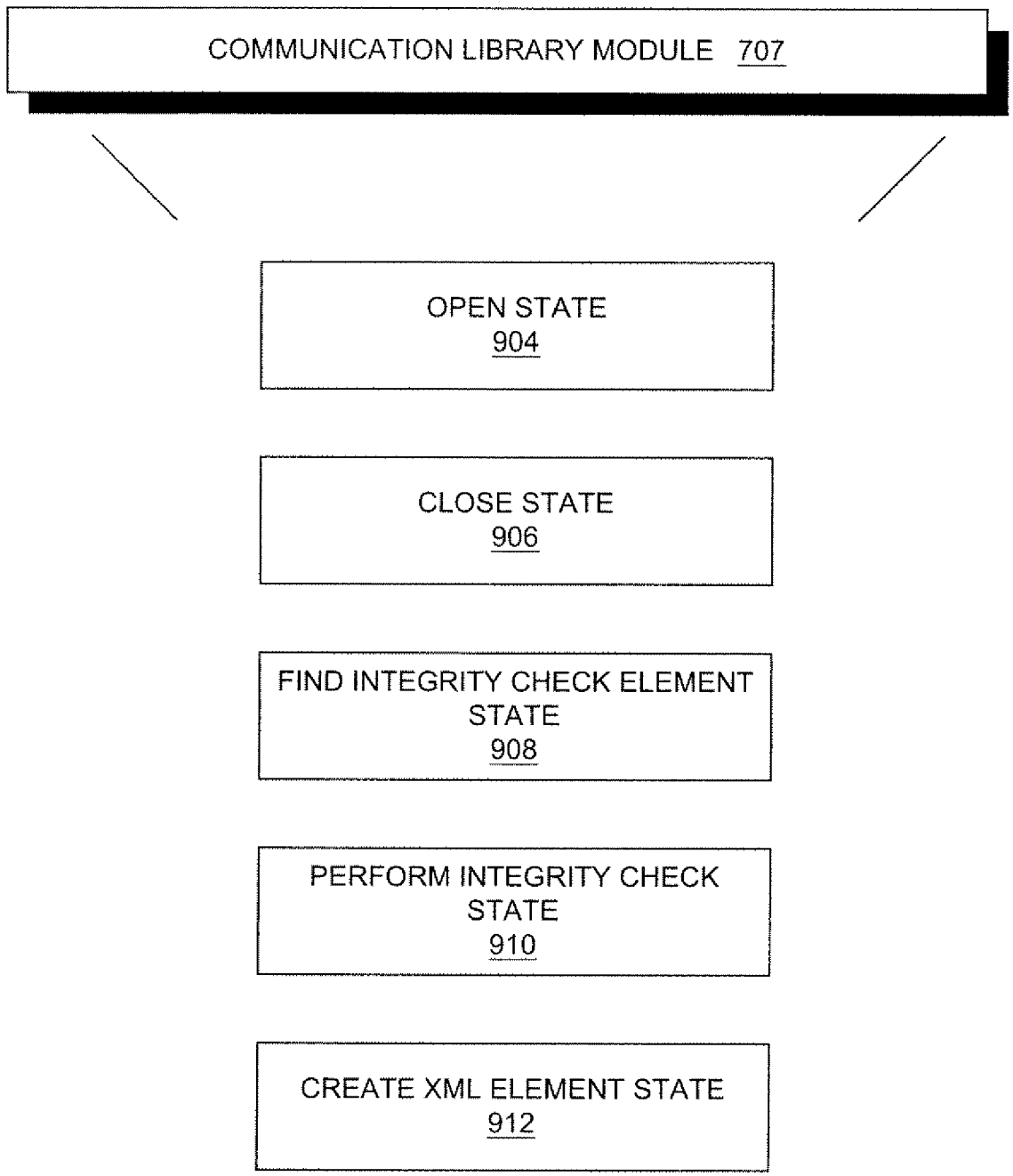
FIG. 9 is a block diagram illustrating states of the communication library that may be used for practicing embodiments of the invention.

FIG. 9 illustrates CLM 707 which may be comprised of states. Exemplary states that may be incorporated in CLM 707 are an open state 904, a close state 906, a find integrity check (IC) element state 908, a perform integrity check state 910 and a create XML element state 912. Depending on the preferences of a designer, CLM 707 may be incorporated inside communication module 702 or it may be designed as an external module operating in conjunction with communication module 702.

Open state 904 is called when CLM 707 is initialized. Open state 904 initializes an external communication medium and obtains memory necessary for CLM 707 to operate. Examples of external communication media are, but are not limited to, IR communication interface 130 or a wireless RF interface such as BLUETOOTH™.

Close state 906 is called when CLM 707 is unloaded. Close state 906 releases memory used by CLM 707. In addition, close state 906 signals the broadcast medium, in the case of bi-directional communications, that CLM 707 is closing.

Find IC element state 908 is the first step in active processing of incoming broadcast information. Find IC element state 908 searches incoming data for the occurrence of integrity check tag 402. When an integrity check tag 402 has been found, execution is passed to the perform integrity check state 910.

Figures 10A, 10B:
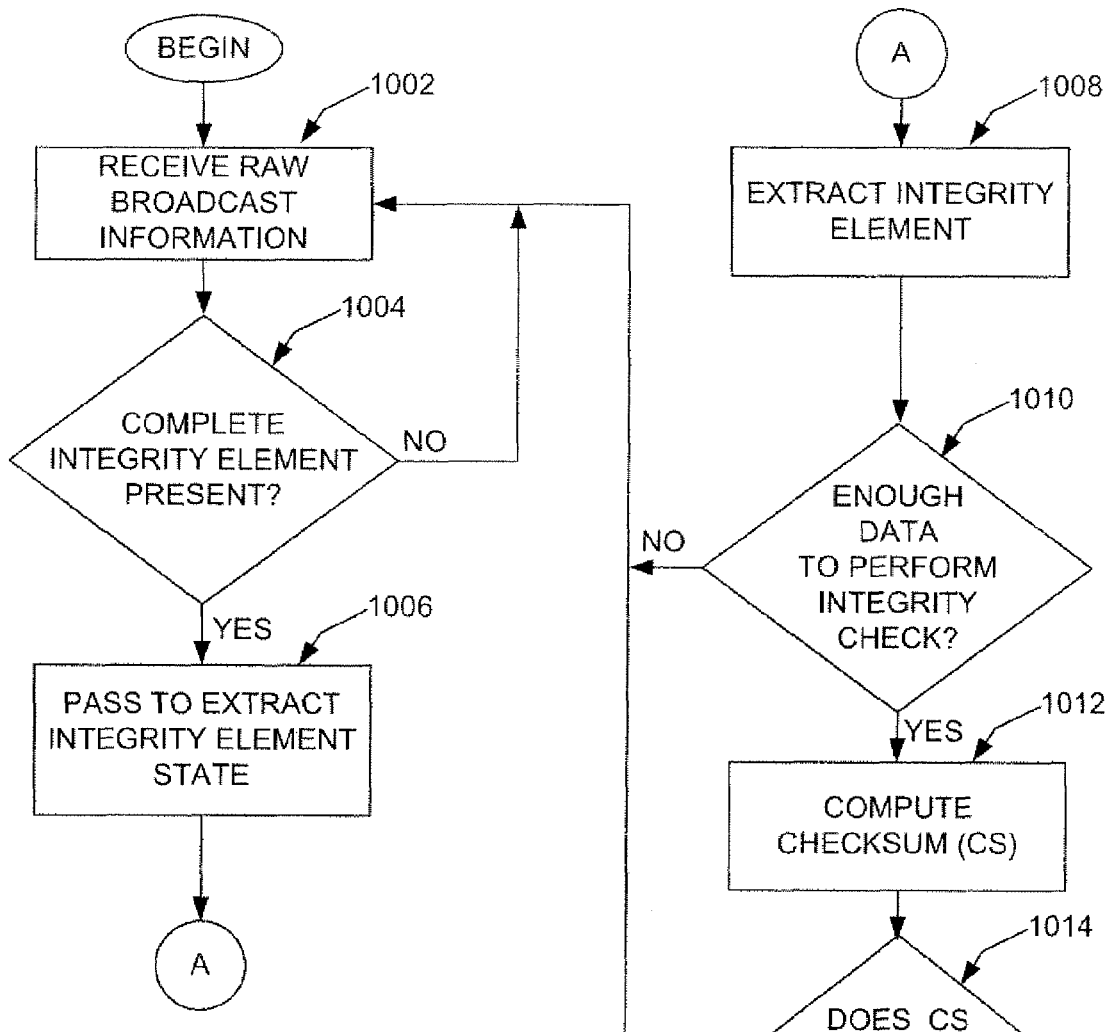
FIGS. 10A and B are flowcharts illustrating an exemplary integrity checking state.

FIGS. 10A and B contains flow diagrams illustrating the operation of find IC element state 908 and perform integrity check state 910, respectively. In FIG. 10A the method begins when broadcast information is received (step 1002). Next, the received data is checked to see if a complete integrity check tag 402 is present (step 1004). If a complete integrity check tag 402 is present, the broadcast information is passed to extract integrity element state 910 and the method of FIG. 10B begins (step 1006). If find IC element state 908 determines that a complete integrity check tag 402 has not been found, it loops back to step 1002 and continues to receive data looking for the occurrence of a complete integrity check tag 402.

FIG. 10B begins when a complete integrity check tag 402 has been found. First, integrity check tag 402 is extracted from broadcast information (step 1008). Then the method determines if enough data is present to perform an integrity check (step 1010). If enough data is present to perform an integrity check, a checksum value is computed across the data bytes making up window 401a (step 1012). If there is not enough data to perform an integrity check, the method reverts back to step 1002 in find IC element state 908 (FIG. 10A). After the checksum is computed in step 1012, it is compared to checksum value 407 contained in integrity check tag 402. If the computed checksum matches checksum value 407 (decision step 1014), integrity check tag 402 is stripped from the data (step 1016). If the computed checksum and checksum value 407 do not match (decision step 1014), control is passed to step 1002 in find IC element state 908 (FIG. 10A) and more data is received. After integrity check tag 402 is stripped, control is passed to create XML element state 912 (step 1018).

Figure 11:
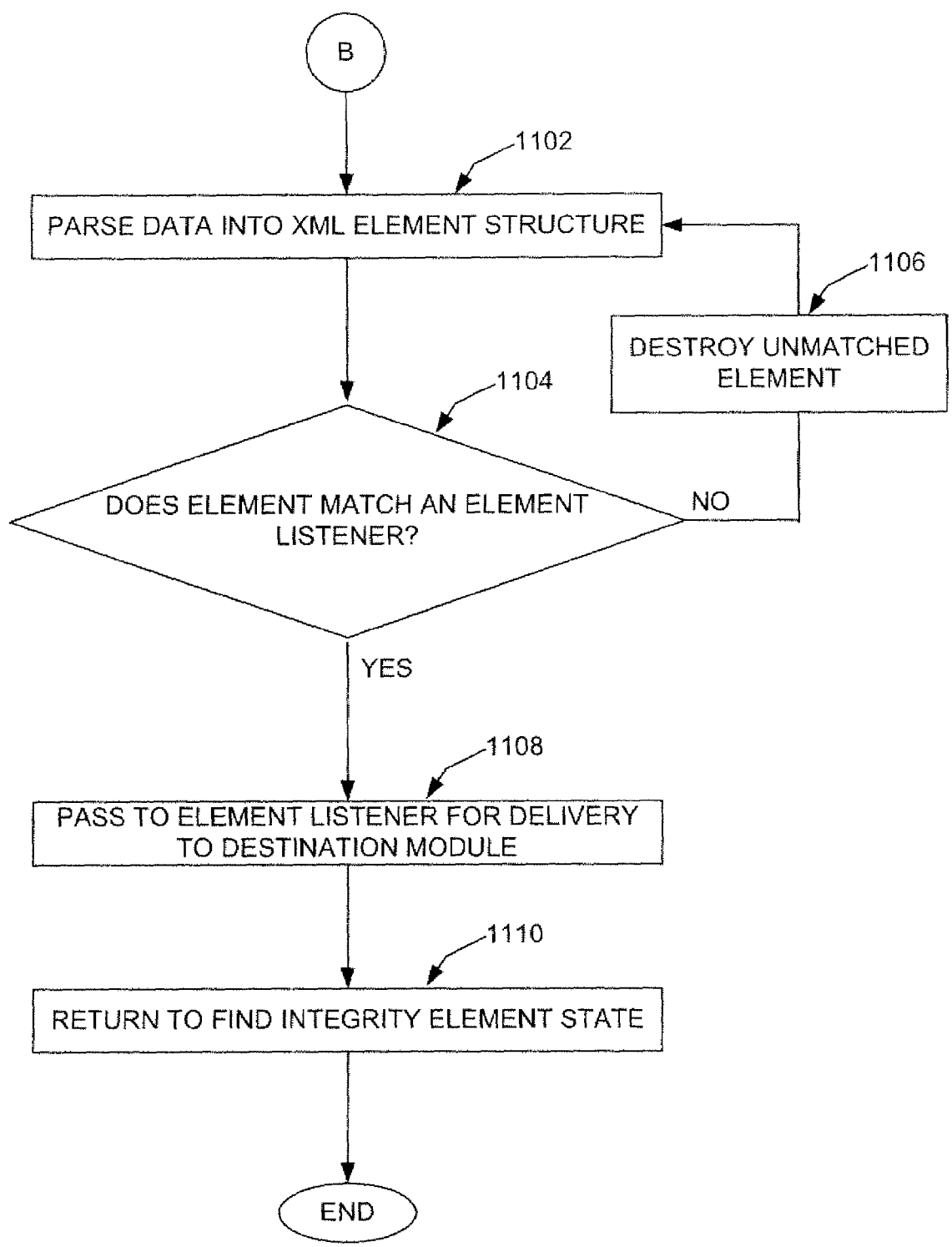
FIG. 11 is a flowchart showing an exemplary create XML state.

FIG. 11 contains a flow diagram illustrating the method performed by create XML element state 912. Create XML element state 912 is responsible for properly parsing received data into an XML structure for delivery to a destination module that has registered an element listener. Create XML element state 912 begins by parsing data received from perform integrity check state 910 (step 1102). Data received by create XML element state 912 is parsed into one or more XML element structures that are appropriate for destination modules such as banner display module 722, service factory module 720, or the like. Next, parsed data is compared to registered element listeners (step 1104). If a registered listener is available for the parsed data, it is passed to the appropriate element listener for forwarding to a destination module (step 1108). If no registered listeners are available, the unmatched parsed data may be destroyed to free up memory (step 1106). After forwarding data to a registered listener or destroying unmatched data, create XML element state 912 parses additional incoming data received from perform integrity check (IC) state 910 and then repeats steps 1102 through 1110.

Since client 112 is receiving contextually relevant information from emitter 108, it is desirable to design the software operating within client 112 in such a manner as to enable client 112 to easily modify its behavior based on the current context that it is operating within. One method for easily modifying the behavior of client 112 is through the use of plug-in modules. A plug-in module is a small piece of software running within a larger program. Plug-in modules make it possible to add additional functionality to larger applications without having to modify the core application. In addition, a plug-in module performs necessary communications and data conversions without requiring a user of a device, such as client 112, to know any special programming or data handling techniques. Methods for developing and integrating plug-in modules are well known in the art, and as such are not described in detail herein.

As used in client 112, a plug-in module helps client 112 operate within a context by performing processing necessary to extract contextually relevant information from received data. In addition, plug-ins may be configured based on a user's preferences or behavior to further aid client 112 when processing contextual data.

Returning to the airline example, a plug-in for Logan airport or a particular airline may be available. If used, an airline plug-in may register for an XML element associated with a particular flight. After registering for the flight, a client 112 operating in a context relevant to the flight XML element would receive information such as the gate number and departure time for a flight associated with the flight XML element.

To obtain maximum utility from a plug-in module, it is beneficial to have it operate in conjunction with other modules operating within client 112. Context behavior module 724 is employed for allowing plugins to easily integrate into and operate in client 112.

Context behavior module 724 may serve as the interface between a plug-in module and the other software modules operating within client 112, for example banner display module 722, communications module 702, service factory module 720, service display module 734, and service container module 730. As an interface, context behavior module 724 is responsible for the persistent storage of a plug-in module and the dynamic loading of it when client 112 is operating in a context associated with the plug-in. Context behavior module 724 determines that it is operating in a context associated with a plug-in when it receives a broadcast information context element for which it has a plug-in.

Figure 12:
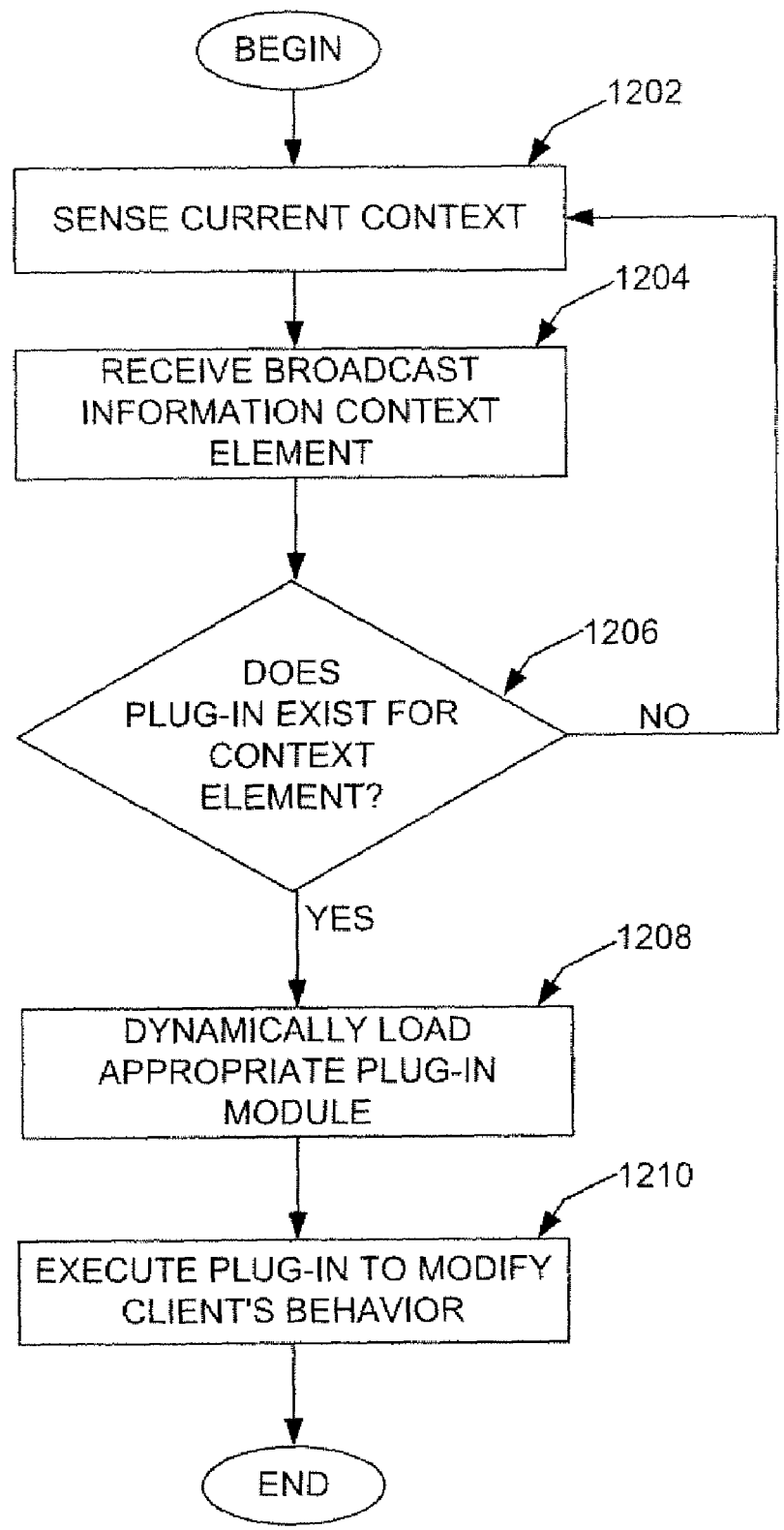
FIG. 12 is a flowchart showing an exemplary context behavior module.

FIG. 12 contains a flow diagram illustrating the method performed by context behavior module 724. Broadcast information is monitored for contextual information (step 1202). When a context element is sensed, it is received by context behavior module 724 (step 1204). Next, context behavior module 724 determines if a plug-in exists for the present context (step 1206). If no plug-in is registered, context behavior module 724 continues to monitor new incoming data until a context element is sensed. If a registered plug-in exists, the appropriate plug-in module is loaded (step 1208). After loading the appropriate plug-in module, it is executed in order to modify the behavior of client 112 (step 1210).

Banner display module 722 is responsible for creating ticker tape like displays that scroll information across display 139. Banner display module 722 registers with communication module 702 so that it can receive banner XML elements. In addition, banner display module 722 may receive banner XML elements from other modules operating within client 112. Information processed and displayed by banner display module 722 may be routine information such as the status of an incoming flight, or it may serve as an alert such as when posting information about a cancelled flight to a user having a reservation on the respective flight.

Figure 13:
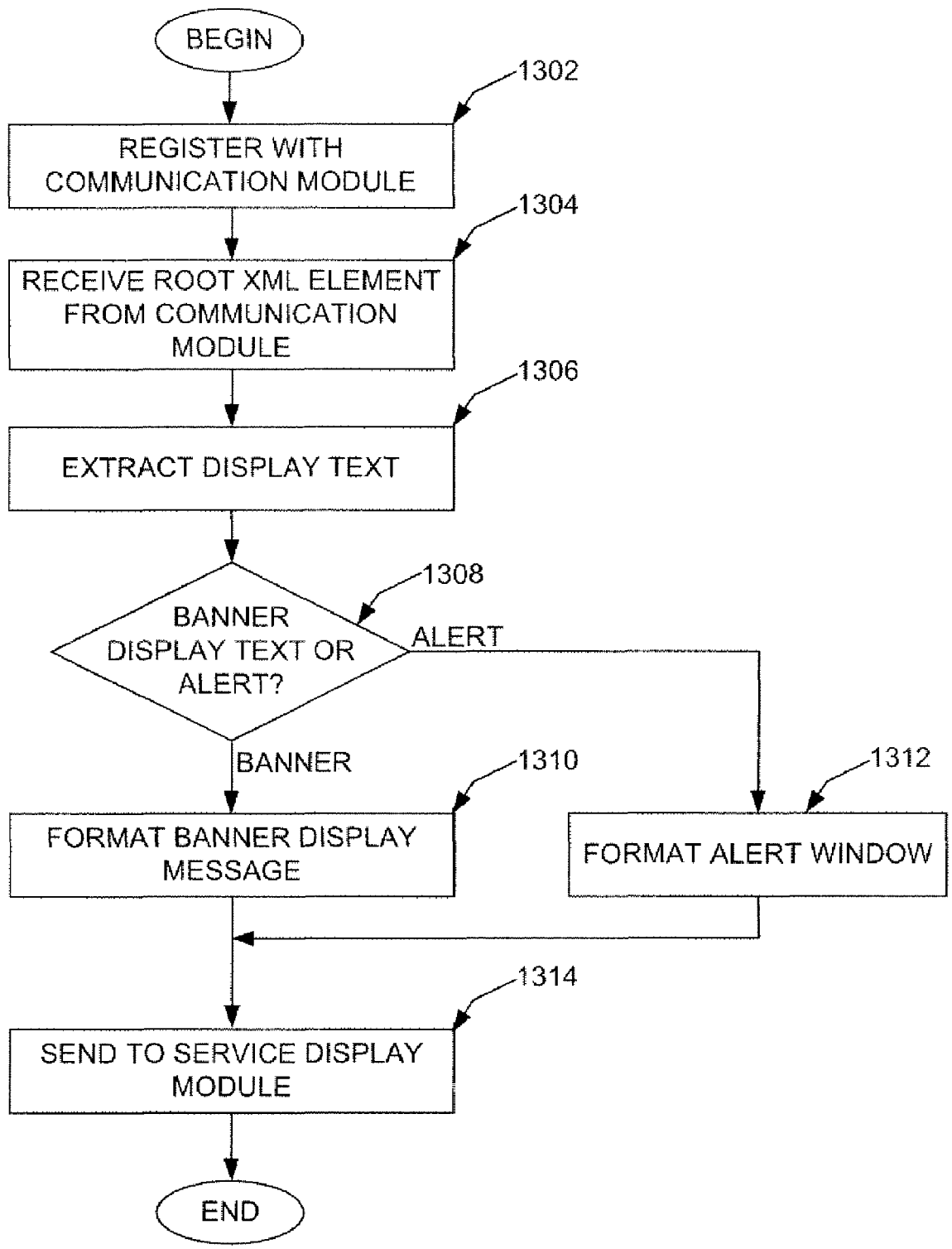
FIG. 13 is a flowchart showing an exemplary banner display module.

FIG. 13 contains a flow diagram illustrating a method performed by banner display module 722. First, banner display module 722 registers with communication module 702 so that it can receive banner messages (step 1302). After registering, banner display module 722 may receive a root banner XML element (step 1304). Upon receiving the banner root XML element, banner display module may extract the text to be displayed contained therein (step 1306). Next, banner display module 722 determines if the text is for a routine banner display or for an alert display (step 1308). If the text is for a routine banner display, the text is formatted for display as such (step 1310). If the text is to be displayed as an alert message, banner display module 722 formats the text into an alert window (step 1312). For an alert message, banner display module 722 may also communicate with a speaker means, vibrating means, or notification means to ensure that a user notices the alert message. After formatting the banner display message or the alert window, the resulting message or window is sent to service display module 734 (step 1314).

Service factory module 720, service container module 730, and service display module 734, all deal with internal representations of services within client 112. These modules use service objects to represent the respective services. Service objects are not the services themselves, but rather they provide client 112 with a convenient way to represent services, as such service objects act as models for received services. In this capacity, service objects contain information necessary to contact a service provider 102 that is providing a service represented by a respective service object. In addition, service objects are used to execute steps required to perform contact with service provider 102 via communication module 702. Service objects are efficiently managed by associating certain parameters with them.

Figure 14:
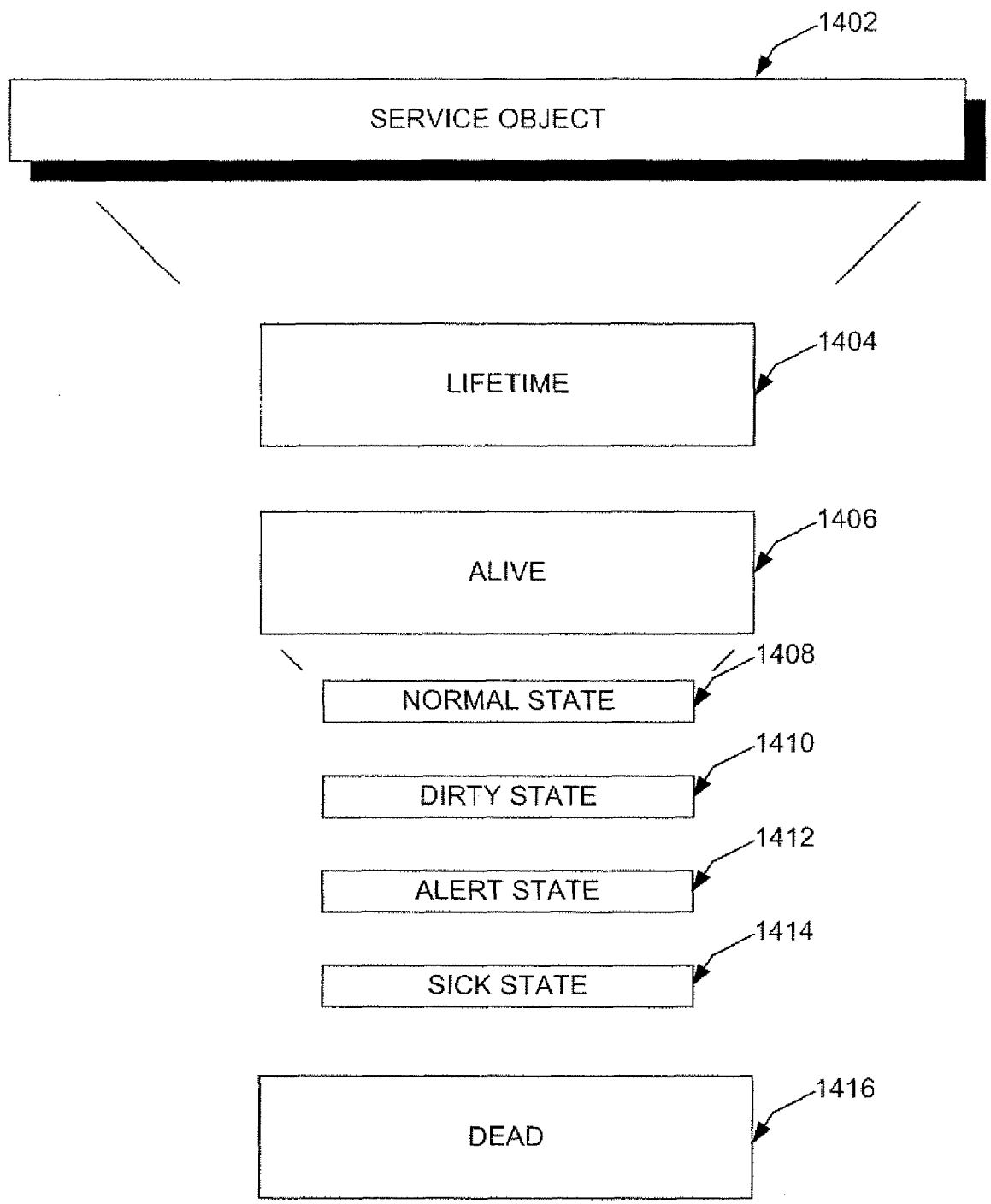
FIG. 14 is a block diagram illustrating exemplary service objects that may be created in a client device.

FIG. 14 illustrates exemplary service objects created in client 112. In addition, FIG. 14 shows states that may be associated with a service object 1402 in client 112. In particular, FIG. 14 shows service object 1402 having a lifetime state 1404, an alive state, and a dead state 1416. Alive state 1406 may further include a normal state 1408, a dirty state 1410, alert state 1412 and a sick state 1414.

Lifetime state 1404 is used to constrain the existence of live service objects to a finite time. Lifetime state 1404 may take on different values depending on the needs of a given service object. In addition, the lifetime associated with a given service object may be extended from a default time by pinging, or querying, lifetime state 1404. Upon pinging, lifetime state 1404 will be extended by one increment of time as defined by a system designer, service provider 102, or client 112. When the lifetime associated with a service object expires, the corresponding service object is destroyed. Since client 112 may have limited memory, it is beneficial to minimize the number of service objects 1402 being tracked. Lifetime state 1404 is responsible for keeping the number of tracked service objects 1402 to a minimum.

Alive state 1406 is used to identify a service object 1402 that exists within client 112. Alive state 1406 is further divided into sub-states to better identify the operation of service object 1402 within client 112. Normal state 1408 is used to describe a service that is ready to be activated by a user of client 112. Dirty state 1410 is used to indicate when a user has already interacted with a service. For example, a service object in dirty state 1410 may have registered a service request with communications module 702 and is waiting for a response from service provider 102. Alert state 1412 describes a service object having pending information for display to a user of client 112. Sick state 1414 describes the situation where a service object is unable to interact with a user of client 112. For example, sick state 1414 may indicate that service object 1402 has an alert to display, but a user has turned off display 139 on client 112 to conserve battery power. Sick state 1414 may also indicate when client 112 has moved out of a context in which a service exists and where the service is associated with the service object. In general, sick state 1414 is used to describe any situation where service object 1402 cannot accomplish its function.

Dead state 1416 identifies a service object 1402 that is not alive. For example, a dead service object may be one that has not been interacted with by a user or one in which the lifetime has expired.

Service factory module 720 generates service object 1402 in client 112 by following a Java factory design pattern. The generation of service objects may be stimulated by broadcast information received by client 112 or by other modules operating therein. Service factory module 720 persistently tracks services received by client 112 and it is responsible for ensuring that information associated with tracking services is properly stored and that service objects are not recreated if they have already been handled.

Figure 15:
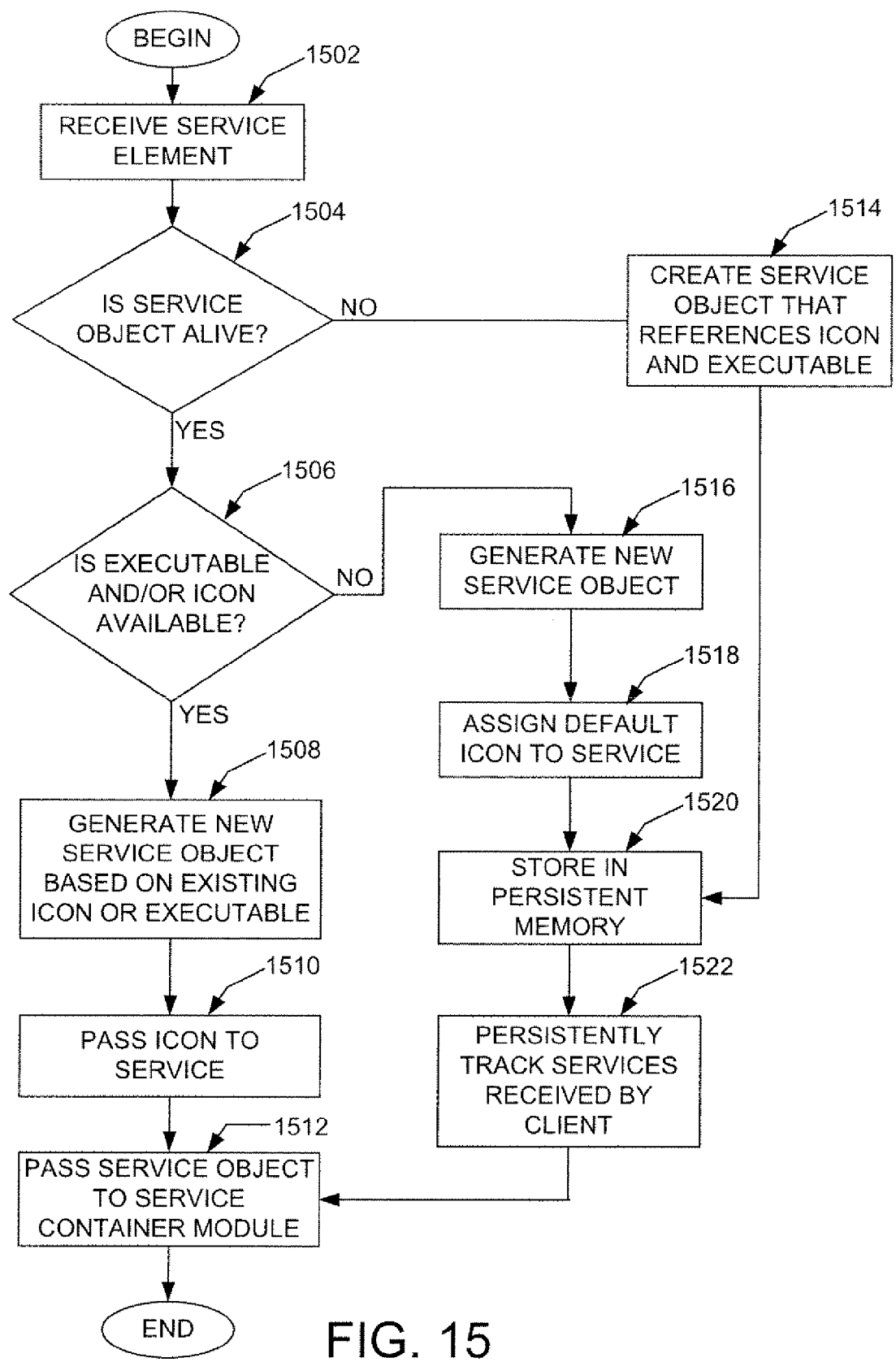
FIG. 15 is a flowchart showing an exemplary service factory module.

FIG. 15 contains a flow diagram illustrating a method performed by service factory module 720. Service factory module 720 receives a service XML element from communication module 702 (step 1502). The service XML element denotes an available service based on a given context of client 112. Service factory module 720 determines if the service object 1402 associated with the service is alive (step 1504). If service object 1402 is alive, service factory module 720 determines if an icon or executable code is available for utilizing the service (step 1506). Service factory module 720 accomplishes this by checking with service container module 730 to determine if a service object 1402 already exists. If service object 1402 already exists, a new service object 1402 is generated from the existing icon or executable code (step 1508). Then the icon is passed to the service associated with service provider 102 (step 1510). Next, service object 1402 associated with the service is passed to service container module 730 (step 1512).

Returning to step 1506, a new service object is generated if no executable code or icon is available (step 1516). The new service object is then assigned a default icon (step 1518) and stored in persistent memory (step 1520). Then the service associated with service object 1402 is persistently tracked by client 112 (step 1522) and passed to service container module 730 (step 1512).

Now returning to step 1504, if no service object 1402 is alive, service factory module 720 creates a new service object 1402 that references the icon or executable (step 1514). Next, service object 1402 is stored in persistent memory (step 1520), persistently tracked (step 1522), and passed to service container module 730 (step 1512).

Service container module 730 stores and tracks all service objects 1402 that are alive within client 112. In addition, service container module 730 kills service objects 1402 when their respective lifetime has expired. When service objects 1402 are tracked, information about them may be stored in a portion of memory referred to as a container.

Figure 16A:
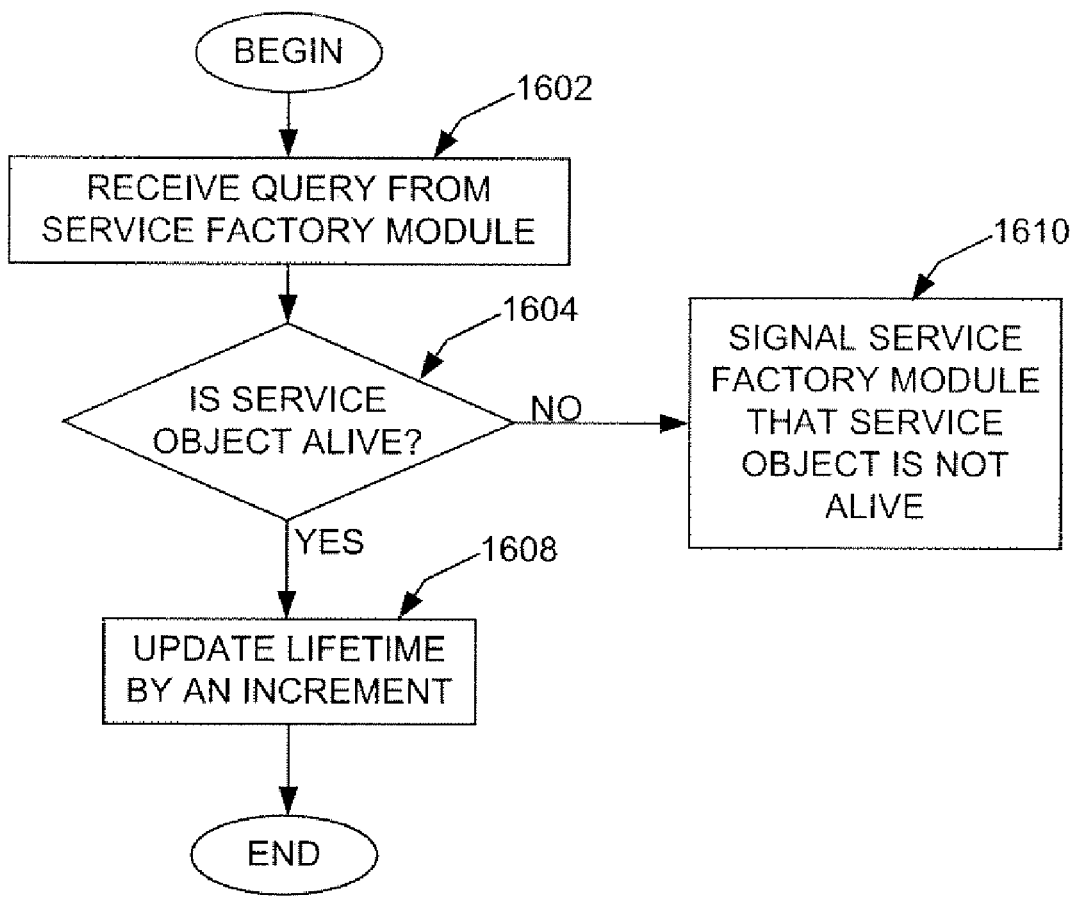
FIGS. 16A, B and C are flowcharts showing operation of an exemplary service container module.

FIGS. 16A, B and C present flow diagrams illustrating the operation of service container module 730. In FIG. 16A, a query referencing service object 1402 is received from service factory module 720 (step 1602). Service container module 730 determines if service object 1402 is alive (step 1604). If service object 1402 is not alive, service factory module 720 is notified so that it can create a new service object for the service (step 1610). If the service object is alive, service container module 730 updates the lifetime by an increment of time (step 1608).

Figure 16B:
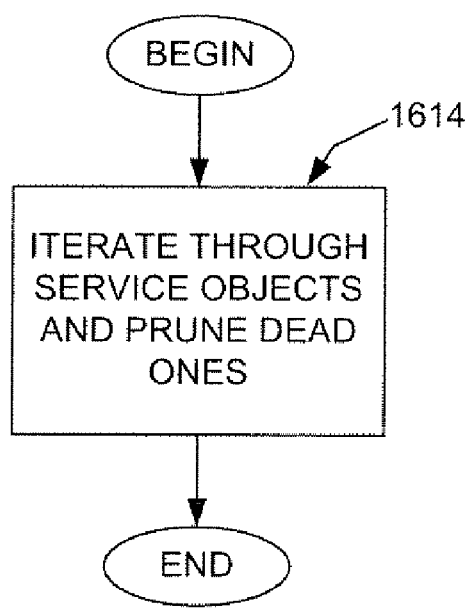

FIG. 16B illustrates a second method of operation for service container module 730. Here, service container module 730 iterates through all service objects 1402 and prunes dead ones (step 1614). When operating to prune dead service objects 1402, service container module 730 does not have to receive inputs from other modules. A software timer may be established for causing service container module 730 to cycle through all service objects 1402.

Figure 16C:
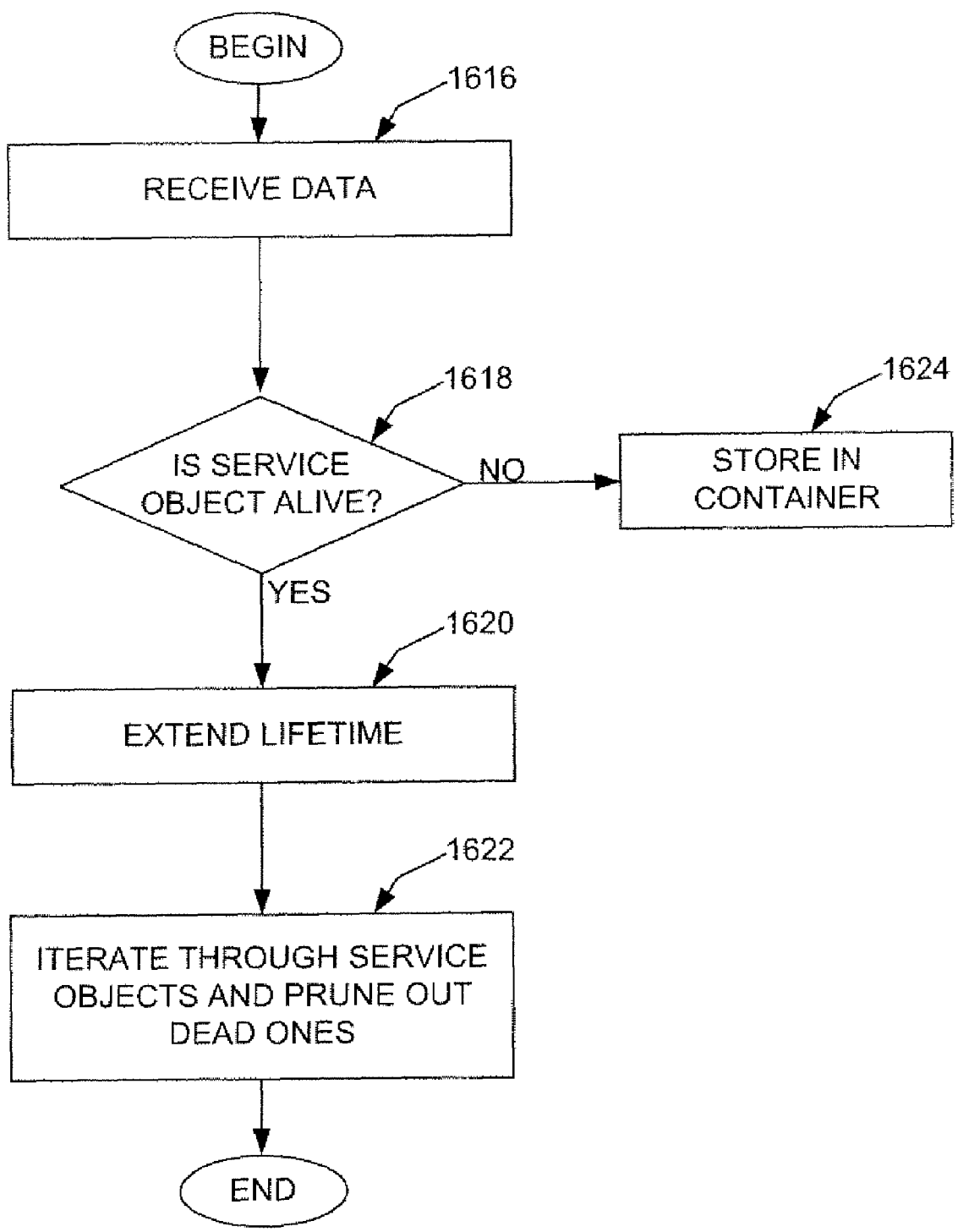

FIG. 16C illustrates a third method of operation for service container module 730. Here, data is received from another module or from an external stimulus (step 1616). The received data is checked to see if the associated service object is alive (step 1618). If service object 1402 is not alive it is stored in a container managed by service container module (step 1624). If service object 1402 is alive, the lifetime is extended by an increment of time (step 1620). After extending the lifetime by an increment, service container module 730 iterates through all service objects 1402 and prunes dead ones (step 1622).

Service display module 734 handles displaying representations of live service objects to a user of client 112. In addition, service display module 734 provides a user with a means for interacting with service objects using a stylus or other input means. Generally it will be advantageous to divide the display into a number of areas each of which is used to convey particular types of information to a user.

Figure 17:
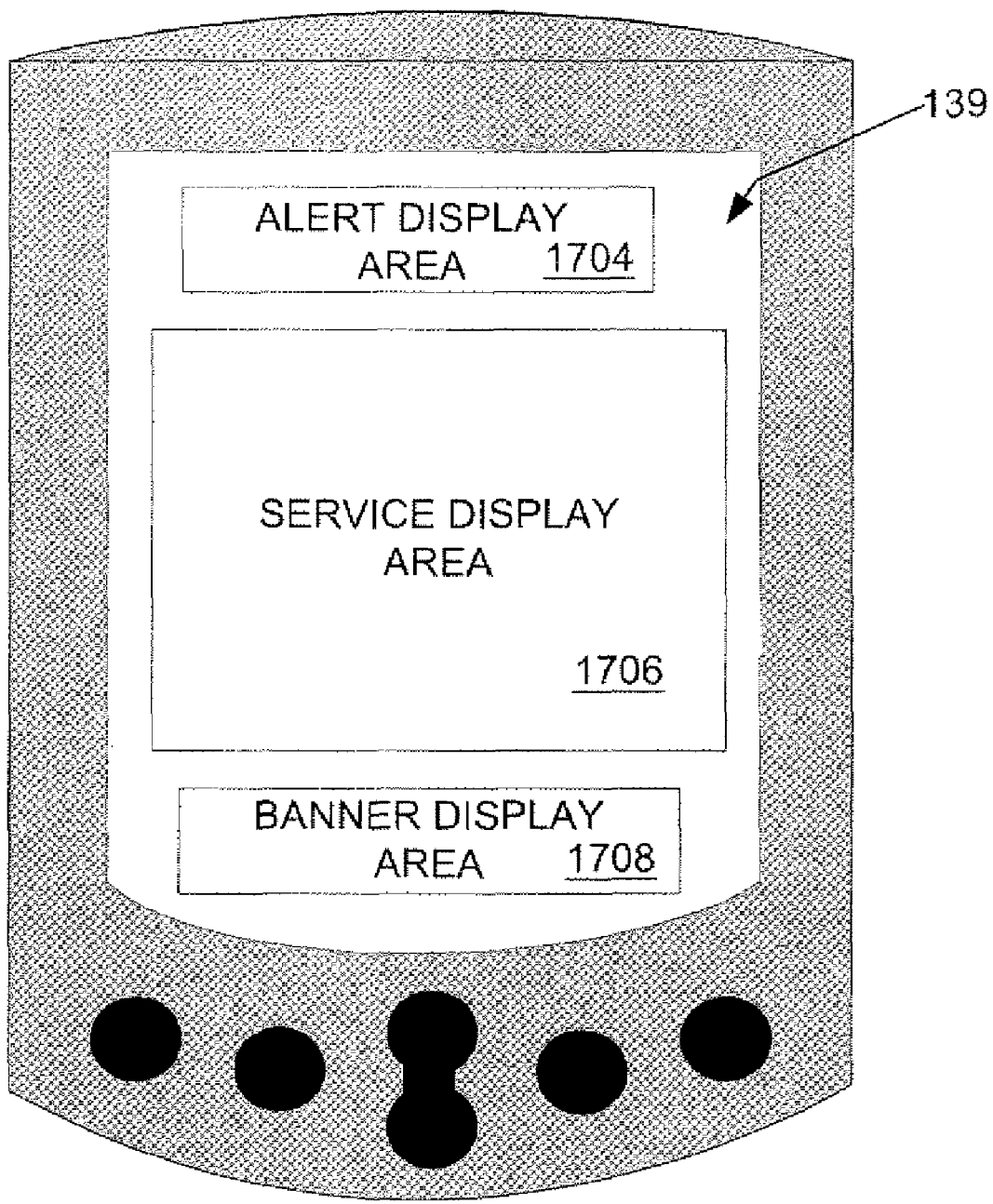
FIG. 17 is an exemplary client device and display.

FIG. 17 illustrates the external features of client 112 in more detail. In particular, display 139 is shown. Display 139 is shown with an exemplary layout of display areas that may be used for conveying data to, and receiving inputs from, a user of client 112. An alert display area 1704 is located near the top of display 139. Alert display area 1704 may be used for displaying alert messages to a user. For example, an alert message may be displayed in alert display area 1704 when client 112 goes out of a coverage area associated with a given emitter 108 or service provider 102. Service display area 1706 may be used to present information about active services to a user. For example, service display area 1706 may be used to display forms to a user after they activate a service. Banner display area 1708 may be used to display banner messages to a user of client 112. For example, a user at a ballpark may receive continuous banner messages containing statistics about the game being watched.

Figure 18:
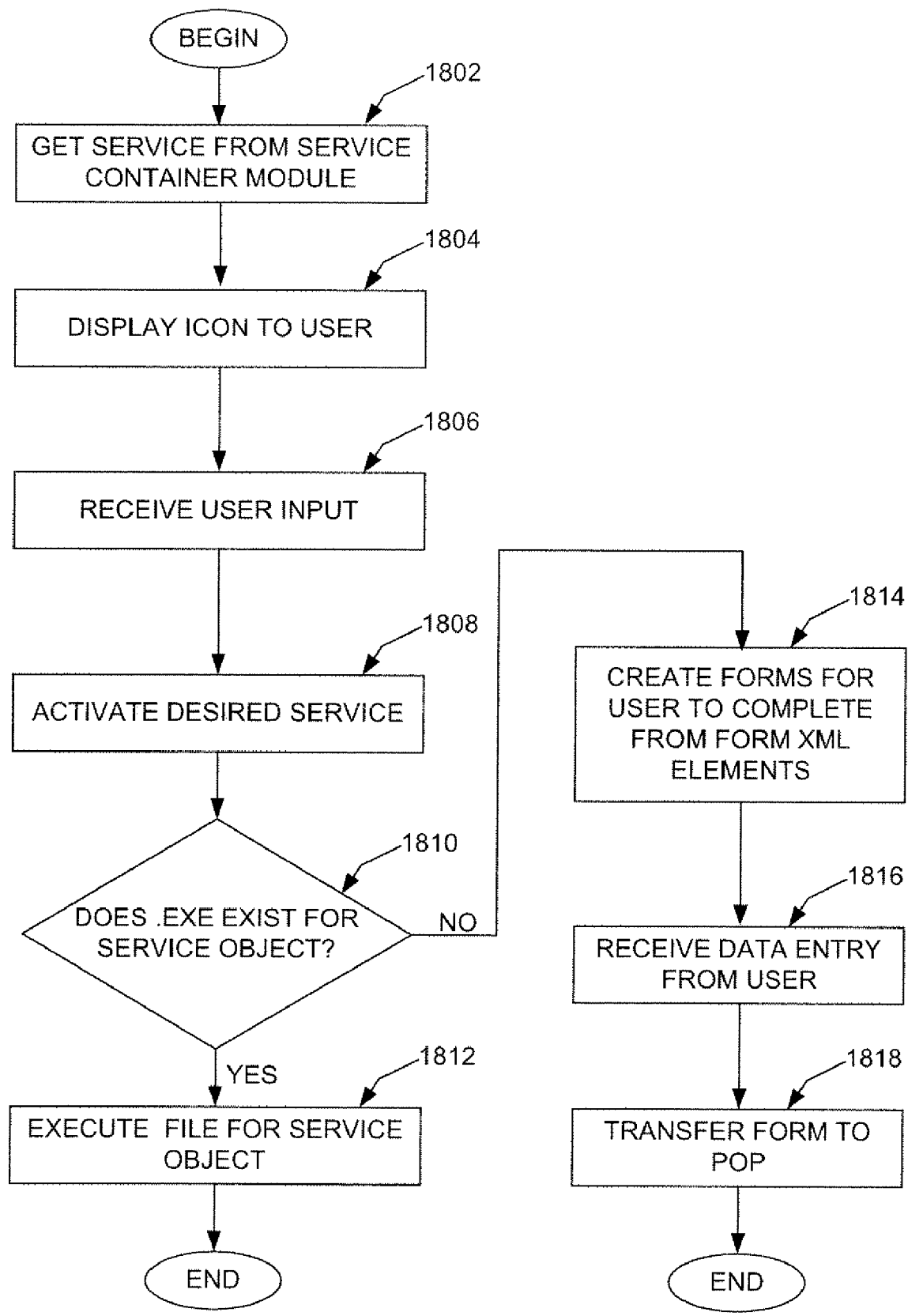
FIG. 18 is a flowchart showing an exemplary service display module.

FIG. 18 illustrates an exemplary method that may be performed by service display module 734. Information is obtained about a service from service container module 730 or from banner display module 722 (step 1802). Then an icon is displayed to a user in service display area 1706 (step 1804). A user interacting with client 112 may enter an input using display 139. The entered information is then received by service display module (step 1806). Next, the desired service may be activated (step 1808). Upon activating the desired service, service display module 734 determines if executable code exists for the service object (step 1810). If executable code exists for the service object, the associated file is executed (step 1812). If the executable code does not exist, forms may be created using form XML elements associated with the service and displayed to a user (step 1814). Then, a user completes the forms (step 1816) and client 112 transfers the data to POP 110 via PDA interface 131 (step 1818).

Figure 19:
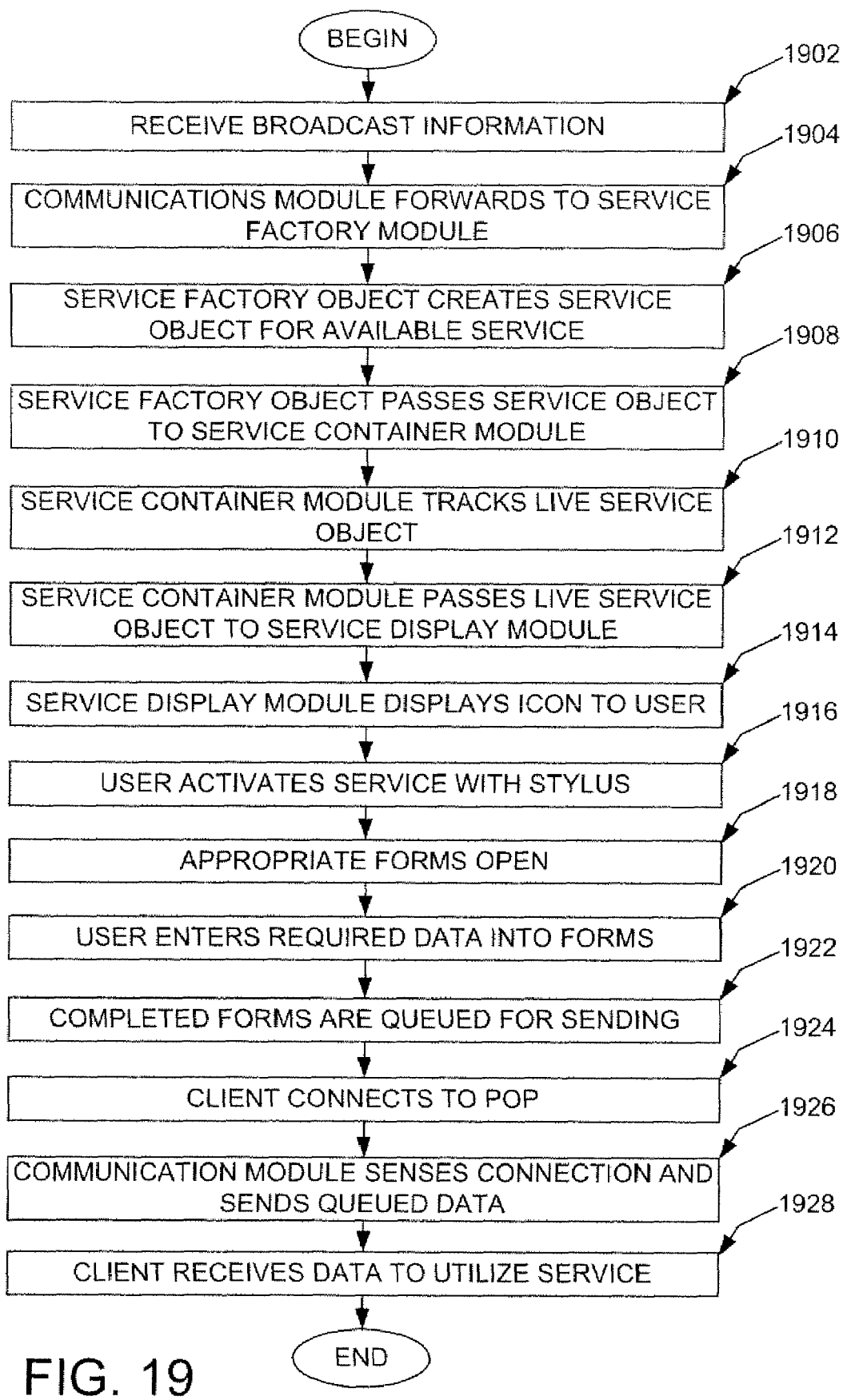
FIG. 19 is a flowchart showing an exemplary interaction between a client device and a service.

FIG. 19 contains an exemplary flow diagram showing an overall method that may be employed by a user when interacting with service provider 102. Client 112 receives broadcast information via emitter 108 (step 1902). Communication module 702 passes the information contained in the received signal to service factory module 720 (step 1904). Service factory module 720 creates a service object 1402 for the available service (step 1906). Then, service factory module 720 passes the newly created service object 1402 to service container module 730 (step 1908). Service container module 730 persistently tracks live service object 1402 (step 1910). Live service object 1402 is then passed to service display module 734 (step 1912). Service display module 734 displays the icon, associated with the service, to a user of client 112 (step 1914). A user activates the service using a stylus or other input means (step 1916). If the service is activated for the first time, forms may open (step 1918), then the user may enter required data (step 1920). The forms are queued for sending by communication module 702 after receiving them from service display module 734 (step 1922). Then client 112 may connect to POP 110 (step 1924). Next, communication module 702 senses the connection and sends queued data (step 1926). After service provider 102 processes data contained in the forms, client 112 receives data and/or executable code required to utilize the service (step 1928). After receiving the data and/or executable code client 112 is able to perform context sensitive computing using the service.

The disclosed invention provides a versatile solution to problems associated with providing contextually relevant information to handheld devices. While preferred embodiments have been presented and discussed in the foregoing detailed description of preferred embodiments, alternative embodiments are possible in view of the teachings contained therein. Alternative embodiments are possible for service provider 102, network 104, controller 106, emitter 108, POP 110 and client 112. Examples of selected alternative embodiments will be provided below.

A first alternative embodiment for client 112 may be practiced by employing a wearable client device. In this embodiment, display 139 may be comprised of a wearable display, also referred to as a heads-up display in the art. A wearable display may be fastenably attached to, or embodied in, a hat or eyeglasses worn by a user; or, the wearable display may be suspended in front of a user's eye using a suspension means fitted over the user's head. In a wearable embodiment, user inputs may be conveyed to conventional processing hardware and software in client 112 using voice commands, sensors attached to a user's fingers, eye movement detectors, or the like. In addition, processing hardware may be embodied in or attached to a user's clothing in the wearable embodiment.

A second alternative embodiment of client 112 may be installed in a vehicle. Such an embodiment may be used to make structures such as parking garages and parking lots more user friendly by providing contextually relevant information to occupants of a vehicle. For example, a parking facility employing the invention may provide a driver with the location of an empty parking spot, information about the vehicle's location within the parking facility, or information about events taking place in venues in proximity to the parking facility. In this embodiment, IR communication interface 130 may be installed in the roof, windshield, bumper, or other suitable location of a vehicle in a manner maximizing reception of emitter signal 142.

A third alternative embodiment of client 112 may use specialized electronic circuitry to further minimize size and power consumption. For example, functionality of client 112 may be incorporated into a field programmable gate array (FPGA) or application specific integrated circuit (ASIC) thus minimizing the size of client 112. For example, FPGAs and ASICs may be used when fabricating a wearable client 112.

A fourth alternative embodiment of the disclosed invention may pool service providers 102 rather than have them operate separately or in small federations. Pooling service providers has the benefit of simplifying bi-directional communications from POP 110 or client 112. Communications are simplified because only one type of message protocol may be required. Here, software coupling the pool of service providers may decode received messages and subsequently pass information on to a relevant service provider(s) within the pool.

In a fifth alternative embodiment controller 106 may be incorporated into one or more service providers 102 rather than being employed as a standalone device as depicted in FIG. 1A. Incorporating controller 106 service provider 102 may be desirable when service provider 102 is communicating with a small number of emitters 108 and POPs 110 having finite coverage areas. An example of this configuration would be if Logan airport acted as service provider 102 and provided information to clients 112 operating only within the airport itself.

A sixth alternative embodiment may be practiced by incorporating emitter 108 or POP 110 into other structures utilizing communication means other than optical. For example it may be desirable to incorporate emitter 108 in to a cellular transceiver servicing a microcell such as a sporting complex. Here integrating emitter 108 with a cellular transceiver allows client 112 to receive information via optical signal 142 and reply using either optical radiation or RF radiation. For example if a sporting complex ran a contest where the first person calling in with a correct answer to a sports trivia question won a prize, a user could receive contextually relevant information about the contest via optical signal 142, provide user input 140 using a stylus, and send a reply directly to the appropriate phone number using an RF signal 143 such as a cellular signal.

In a seventh alternative embodiment, emitter 108 and POP 110 may generate optical signal 142 by modulating an electric light using techniques known in the art. Several techniques are known in the art for modulating the drive signal to incandescent or fluorescent lights in a manner that causes the lights to emit infrared signals while still performing their normal lighting functions. Using existing lighting fixtures as emitters may help produce cost effective infrastructures for delivering contextually relevant information to a user of client 112.

In an eighth alternative embodiment, broadcast signals may not employ XML elements. In a preferred embodiment, broadcast signals comprised XML elements to facilitate context sensitive computing without requiring excessive processing in client 112. In embodiments where client 112 does not have limited processing power, broadcast signals may take on essentially any form and may employ essentially any network protocol. For example, if client 112 is installed in a vehicle, minimizing power consumption is not normally an issue. Therefore, the infrastructure may employ protocols and data types that require more processing at client 112 without placing undue strain on it.

In a ninth alternative embodiment, controller 106, emitter 108 or client 112 may be designed using object oriented programming techniques. Object oriented programming utilizes software modules, or objects, as the primary building blocks for software on a respective platform. Modules are designed so that they accept inputs from and provide outputs to other software modules according to a defined format. Modules wishing to communicate with each other need only know the input or output format of the module they wish to communicate with. Using object oriented programming techniques makes it possible for controller 106, emitter 108, or client 112 to take on differing levels of functionality based on their respective environments. For example, controller 106 may be implemented with a software module that sends data in XML format and another module that sends data in an encrypted format. A controller 106 so equipped can switch from communicating XML elements to encrypted traffic by interfacing the appropriate module to link 116. An important benefit of using object oriented programming techniques is that components can modify their operation without requiring hardware changes which tend to be expensive and time consuming to implement. As can be seen, using object oriented programming techniques allows the invention to be easily adapted for addressing a wide range of wireless communication problems.

As can be seen from the alternative embodiments and preferred embodiments discussed herein, it will be obvious to those skilled in the relevant arts that many additional embodiments and modifications are possible without departing from the spirit of the invention. Therefore, the present embodiments are to be considered in all respects as illustrative and not restrictive, the scope of the invention being indicated by the appended claims rather than by the foregoing description, and all changes within the meaning and range of equivalency of the claims are therefore intended to be embraced therein.

What is claimed is:

1. A handheld device for receiving an infrared transmitted signal containing a message over a communication medium, said handheld device comprising:
   a physical layer;
   a link layer;
   means for receiving said transmitted signal to form a received signal;
   means for passing said received signal to said physical layer;
   means for passing said received signal from said physical layer to said link layer;
   means for determining if said received signal is a unidirectional signal or a bi-directional signal;
   means for processing said unidirectional signal without handshaking if said handheld device is not coupled to a handheld interface in a Point-Of-Presence (POP);
   means for processing said bidirectional signal with handshaking; and
   means for utilizing information contained in said received signal to accomplish a task.

2. The handheld device of claim 1 wherein said receiving means is a bi-directional infrared communication interface.

3. The handheld device of claim 2 wherein said transmitted signal is a diffuse infrared signal.

4. The handheld device of claim 3 wherein said transmitted signal is conveyed in a format compatible with said physical layer and said link layer.

5. The handheld device of claim 4 wherein said physical layer and said link layer are infrared-data-association (IrDA) compliant.

6. The handheld device of claim 5 wherein said transmitted signal includes a broadcast XML element containing said information.

7. The handheld device of claim 6 wherein said transmitted signal contains an integrity XML element encapsulating said broadcast XML element.

8. The handheld device of claim 7 wherein said receiving means is an infrared-data-association (IrDA) compliant communication interface.

9. The handheld device of claim 8 wherein said transmitted signal comprises an on-interval corresponding to the presence of said transmitted signal at said receiving means and an off interval corresponding to the absence of said transmitted signal at said receiving means, said on-interval and said off-interval being separated by an interval of time, said on-interval further conveying at least a portion of said transmitted signal to said receiving means.

10. The handheld device of claim 9 wherein said link layer can accommodate a signal containing less than an entire message during said on-interval.

11. The handheld device of claim 8 wherein said transmitted signal includes a first on-interval, a first off interval occurring immediately after said first on-interval, a second on-interval occurring immediately after said first off interval and a second off interval occurring immediately after said second on-interval.

12. The handheld device of claim 11 wherein said link layer can accommodate said received signal when a portion of said message is present during said first on-interval and the remainder of said message is present during said second on-interval.

13. A method of utilizing executable code in a handheld device comprising the steps of:
   receiving a signal at a physical layer communicatively associated with a communication interface to form a received signal;
   processing said received signal as a unidirectional signal without handshaking if said handheld device is not coupled to a handheld interface in a Point-Of-Presence (POP);
   processing said received signal as a bi-directional signal with said handshaking if said handheld device is coupled to a handheld interface in said Point-Of Presence (POP);
   performing said handshaking if said received signal is a bi-directional signal;
   passing said received signal from said physical layer to a link layer;
   extracting information contained in said received signal; and
   making said information available to a user of said handheld device.

14. The method of claim 13 wherein said communication interface is an infrared-data-association (IrDA) compliant interface.

15. The method of claim 14 wherein said received signal is obtained from a transmitter having a emitter link layer.

16. The method of claim 15 wherein said emitter link layer is compatible with said link layer.

17. The method of claim 16 further including a plug-in, said plug-in for performing said step of extracting information and said step of making said information available.

18. A method of receiving a unidirectional-infrared-data-signal from a transmitter comprising:
   receiving said data signal at a communication interface to form a received signal;
   processing said received signal as a unidirectional signal without handshaking if said step of receiving is not accomplished by coupling with a Point-Of-Presence (POP);
   processing said received signal as a bi-directional signal with said handshaking if said step of receiving is accomplished by coupling with a Point-Of Presence (POP);
   performing said handshaking if said received signal is a bi-directional signal;
   passing said received signal from said communication interface to a physical layer;
   making said received signal available to a link layer; and
   utilizing information contained in said received signal to accomplish a task.

19. The method of claim 18 wherein said communication interface is an infrared-data-association (IrDA) compliant communication interface.

20. The method of claim 19 wherein said data signal is comprised of an on-interval corresponding to the presence of said data signal at said communication interface and an off-interval corresponding to the absence of said data signal at said communication interface, said on-interval and said off-interval separated by an interval of time, said on-interval further conveying at least a portion of said data signal to said physical layer.

* * * * *

UNITED STATES PATENT AND TRADEMARK OFFICE
CERTIFICATE OF CORRECTION

PATENT NO.        : 7,480,462 B2                                      Page 1 of 1
APPLICATION NO.   : 11/745117
DATED             : January 20, 2009
INVENTOR(S)       : Noah J. Ternullo et al.

It is certified that error appears in the above-identified patent and that said Letters Patent is hereby corrected as shown below:

In column 27, line 54 (claim 9), "off interval" should read --off-interval--

In column 27, line 62 (claim 11), "off interval" should read --off-interval--

In column 27, line 64 (claim 11), "off interval" should read --off-interval--

In column 27, line 65 (claim 11), "off interval" should read --off-interval--

In column 28, line 17 (claim 13), "Point-Of Presence" should read --Point-Of-Presence--

In column 28, line 46 (claim 18), "Point-Of Presence" should read --Point-Of-Presence--

Signed and Sealed this

Twenty-fourth Day of March, 2009

JOHN DOLL
*Acting Director of the United States Patent and Trademark Office*